(12) United States Patent
Lee et al.

(10) Patent No.: US 12,375,596 B2
(45) Date of Patent: Jul. 29, 2025

(54) APPARATUS HAVING SLOT ANTENNA USING CAMERA COVER IN ELECTRONIC DEVICE

(71) Applicant: SAMSUNG ELECTRONICS CO., LTD., Suwon-si (KR)

(72) Inventors: Minkyung Lee, Suwon-si (KR); Mincheol Seo, Suwon-si (KR); Donghun Shin, Suwon-si (KR); Yoonjung Kim, Suwon-si (KR); Huiwon Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 223 days.

(21) Appl. No.: 18/212,696

(22) Filed: Jun. 21, 2023

(65) Prior Publication Data
US 2023/0336648 A1 Oct. 19, 2023

Related U.S. Application Data

(63) Continuation of application No. PCT/KR2021/019534, filed on Dec. 21, 2021.

(30) Foreign Application Priority Data

Dec. 21, 2020 (KR) .................... 10-2020-0179868

(51) Int. Cl.
*H04M 1/02* (2006.01)
*H01Q 13/10* (2006.01)

(52) U.S. Cl.
CPC .......... *H04M 1/0264* (2013.01); *H01Q 13/10* (2013.01)

(58) Field of Classification Search
CPC ..... H04M 1/0264; H01Q 13/10; H01Q 5/307; H01Q 1/44; H01Q 21/28; H01Q 1/243; H01Q 13/106
See application file for complete search history.

(56) References Cited

U.S. PATENT DOCUMENTS 9,531,071 B2 12/2016 Guterman et al.
10,236,559 B2 3/2019 Han et al.
(Continued)

FOREIGN PATENT DOCUMENTS

CN 103390793 A 11/2013
CN 204168352 U 2/2015
(Continued)

OTHER PUBLICATIONS

International Search Report and Written Opinion for International Application No. PCT/KR2021/019534; International Filing Date Dec. 21, 2021; Date of Mailing Apr. 12, 2022; 58 Pages.
(Continued)

*Primary Examiner* — Mekonnen D Dagnew
(74) *Attorney, Agent, or Firm* — CANTOR COLBURN LLP

(57) ABSTRACT

An electronic device includes a camera cover, a wireless communication circuit, a first frame, a second frame and a third frame, extends from a second surface along a part not included in a first surface and the second surface among the periphery of the camera cover, and is connected to the camera cover. The second frame is positioned away from the first frame to form a part of the second surface, and extends from the second surface to form a part of a third surface. The third frame has a gap from the first frame in a specific direction in a first area and is connected to the first frame in a second area. The wireless communication circuit can receive a signal of a specific frequency band by feeding power to a slot structure comprising the gap between the first frame and the third frame.

15 Claims, 22 Drawing Sheets

(56) References Cited

U.S. PATENT DOCUMENTS

| | | | |
|---|---|---|---|
| 10,314,186 B2 | 6/2019 | Wang et al. | |
| 10,886,607 B2 * | 1/2021 | Ayala Vazquez | H01Q 1/42 |
| 10,931,034 B2 * | 2/2021 | Zhu | H01Q 21/28 |
| 10,951,260 B2 * | 3/2021 | Jung | H04B 1/525 |
| 11,349,198 B2 | 5/2022 | Chen et al. | |
| 12,189,439 B2 * | 1/2025 | Silvanto | G06F 1/1637 |
| 2018/0183137 A1 | 6/2018 | Tsai et al. | |
| 2018/0301787 A1 | 10/2018 | Han et al. | |
| 2019/0081393 A1 | 3/2019 | Zhou et al. | |
| 2019/0356040 A1 | 11/2019 | Kim et al. | |
| 2020/0036820 A1 | 1/2020 | Lee et al. | |
| 2020/0100402 A1 | 3/2020 | Schmitt et al. | |
| 2020/0310489 A1 | 10/2020 | Spraggs et al. | |
| 2022/0216595 A1 | 7/2022 | Seo et al. | |

FOREIGN PATENT DOCUMENTS

| | | |
|---|---|---|
| CN | 111092292 A | 5/2020 |
| KR | 20190131112 A | 11/2019 |
| KR | 20200101240 A | 8/2020 |
| KR | 20200115090 A | 10/2020 |

OTHER PUBLICATIONS

European Search Report corresponding to Application No. EP21911490.7; Issue Date: Apr. 23, 2024.

* cited by examiner

APPARATUS HAVING SLOT ANTENNA USING CAMERA COVER IN ELECTRONIC DEVICE

CROSS-REFERENCE TO RELATED APPLICATION(S

This application is a continuation application, claiming priority under § 365(c), of International Application No. PCT/KR2021/019534, filed on Dec. 21, 2021, which is based on and claims the benefit of Korean patent application number 10-2020-0179868 filed on Dec. 21, 2020, in the Korean Intellectual Property Office, the disclosures of which are incorporated by reference herein in their entireties.

TECHNICAL FIELD

Embodiments disclosed in the present document relate to an electronic device having a slot antenna implemented therein.

BACKGROUND ART

An electronic device having a communication function is miniaturized and lightened but may include a plurality of antennas to provide mobile communication services of different frequency bands through one electronic device. For example, in IEEE 802.11n, IEEE 802.11ac and IEEE 802.11ax standards, a multi-input multi-output (MIMO) technique is defined, and a MIMO antenna related to 2G/3G/4G/5G may be mounted in an electronic device.

An electronic device may use a frame structure of the electronic device in order to implement a plurality of antennas in a limited space, and may use segments formed in the frame structure at regular intervals as antennas. In order to compensate for a monopole type or a short length, a low band, a mid band, a high band and a WiFi band may be implemented by using an inverted F antenna (IFA) type.

Recent electronic devices may have an increased number of cameras or an increased camera lens aperture in order to meet consumers' needs and ensure image quality of cameras and an angle of view, and hence, a camera cover may also be extended. Accordingly, the extended camera cover may include a part of a side surface of the electronic device.

DISCLOSURE OF INVENTION

Technical Problem

When multiple communication bands such as 2G/3G/4G/5G are required in an electronic device like a related-art portable terminal, the electronic device may ensure a broad frequency bandwidth through an IFT type antenna which uses three segments of a frame structure of the electronic device. However, as the number of cameras or their sizes increase to meet consumers' needs and ensure image quality of cameras and an angle of view, a camera cover may be extended and form a part of a side surface of the electronic device. The camera cover forms a part of the side surface on behalf of a related-art frame structure, and hence, it may be difficult to implement some of IFA type antennas which are implemented by the frame structure including segments of the side surface.

Various embodiments disclosed in the present document provide an apparatus which is capable of additionally ensuring a necessary frequency band by implementing a slot antenna in an electronic device using a camera cover and a frame structure coupled to the camera cover, and implementing multiple frequency bands.

Solution to Problem

According to various embodiments of the disclosure, an electronic device may include: a frame structure which forms at least part of a side surface of the electronic device; a camera cover which is integrally formed with the frame structure or is coupled with the frame structure; and a wireless communication circuit, and the side surface of the electronic device formed by the frame structure may include a first surface, a second surface extended from the first surface and perpendicular to the first surface, and a third surface extended from the second surface and perpendicular to the second surface and parallel to the first surface, the camera cover may include a first corner where the first surface and the second surface intersect each other, and may form a part of the first surface of the side surface and a part of the second surface, the frame structure may include a first frame, a second frame, and a third frame, and the first frame may form a part of the second surface of the side surface, and may be extended from the second surface along a portion of the periphery of the camera cover that is not included in the first surface and the second surface, and may be coupled with the camera cover, the second frame may be spaced apart from the first frame to form a part of the second surface, and may be extended from the second surface to form a part of the third surface, and the third frame may be spaced apart from the second frame and may have a gap of a designated direction from the first frame in a first area and may be connected with the first frame in a second area, and the wireless communication circuit may receive a signal of a designated frequency band by feeding power to one point of a slot structure, the slot structure being extended in parallel with the first surface and including the gap between the first frame and the third frame.

According to various embodiments of the disclosure, an electronic device may include: a frame structure which forms at least part of a side surface of the electronic device; a camera cover which is integrally formed with the frame structure or is coupled with the frame structure; and a wireless communication circuit, and the side surface of the electronic device formed by the frame structure may include a first surface, a second surface extended from the first surface and perpendicular to the first surface, and a third surface extended from the second surface and perpendicular to the second surface and parallel to the first surface, the camera cover may include a first corner where the first surface and the second surface intersect each other, and may form a part of the first surface of the side surface and a part of the second surface, the frame structure may include a first frame, a second frame, and a third frame, and the first frame may form a part of the second surface of the side surface, and may be extended from the second surface along a portion of the periphery of the camera cover that is not included in the first surface and the second surface, and may be coupled with the camera cover, the second frame may be spaced apart from the first frame to form a part of the second surface, and may be extended from the second surface to form a part of the third surface, and the third frame may be spaced apart from the second frame and may have a gap of a designated direction from the first frame in a first area and may be connected with the first frame in a second area, and the wireless communication circuit may receive a signal of a designated frequency band by feeding power to one point of a slot structure, the slot structure being extended in parallel with the second surface and including the gap between the first frame and the third frame.

Advantageous Effects of Invention

According to various embodiments disclosed in the present document, the frame structure coupled with the camera cover may form a slot structure, and the wireless communication circuit may feed power to one point of the frame structure, so that the electronic device may receive an RF signal of a frequency band of 1500 to 2500 MHz.

In addition, according to various embodiments, the gap of the slot structure may have a designated size, and the electronic device may implement impedance matching of a slot antenna including the slot structure through the gap.

According to various embodiments, the electronic device may implement an IFA type antenna using a slot antenna and a segment structure of a frame for implementing multiple bands without extending an additional space of the electronic device.

In addition, various effects that may be directly or indirectly understood through the present document may be provided.

BEST MODE FOR CARRYING OUT THE INVENTION

Hereinafter, various embodiments of the disclosure will be described with reference to the accompanying drawings. However, these are not intended to limit the disclosure to a specific embodiment and should be understood as including various modifications, equivalents, or alternatives of embodiments of the disclosure.

Figure 1A:
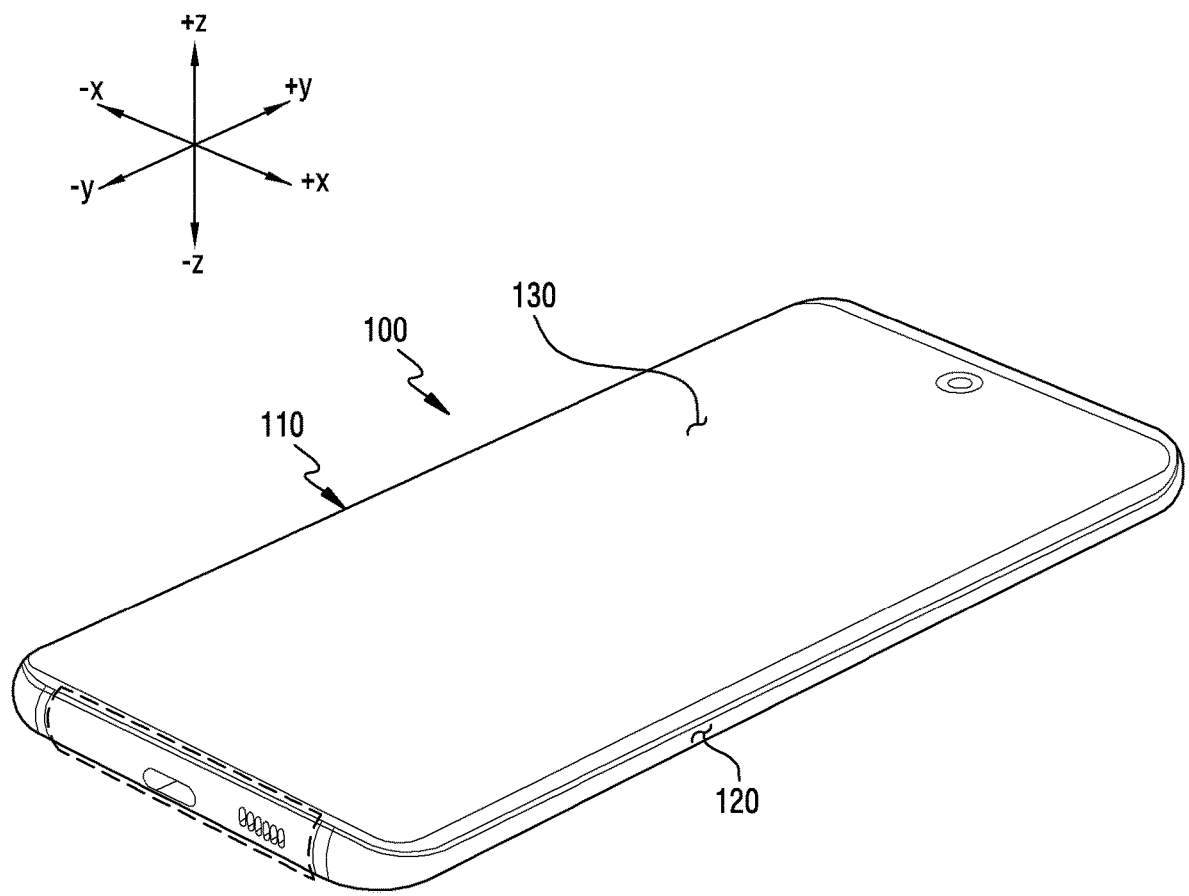
FIG. 1A is a perspective view illustrating a front surface of an electronic device according to an embodiment.

FIG. 1A is a perspective view illustrating a front surface of an electronic device according to an embodiment.

Figure 1B:
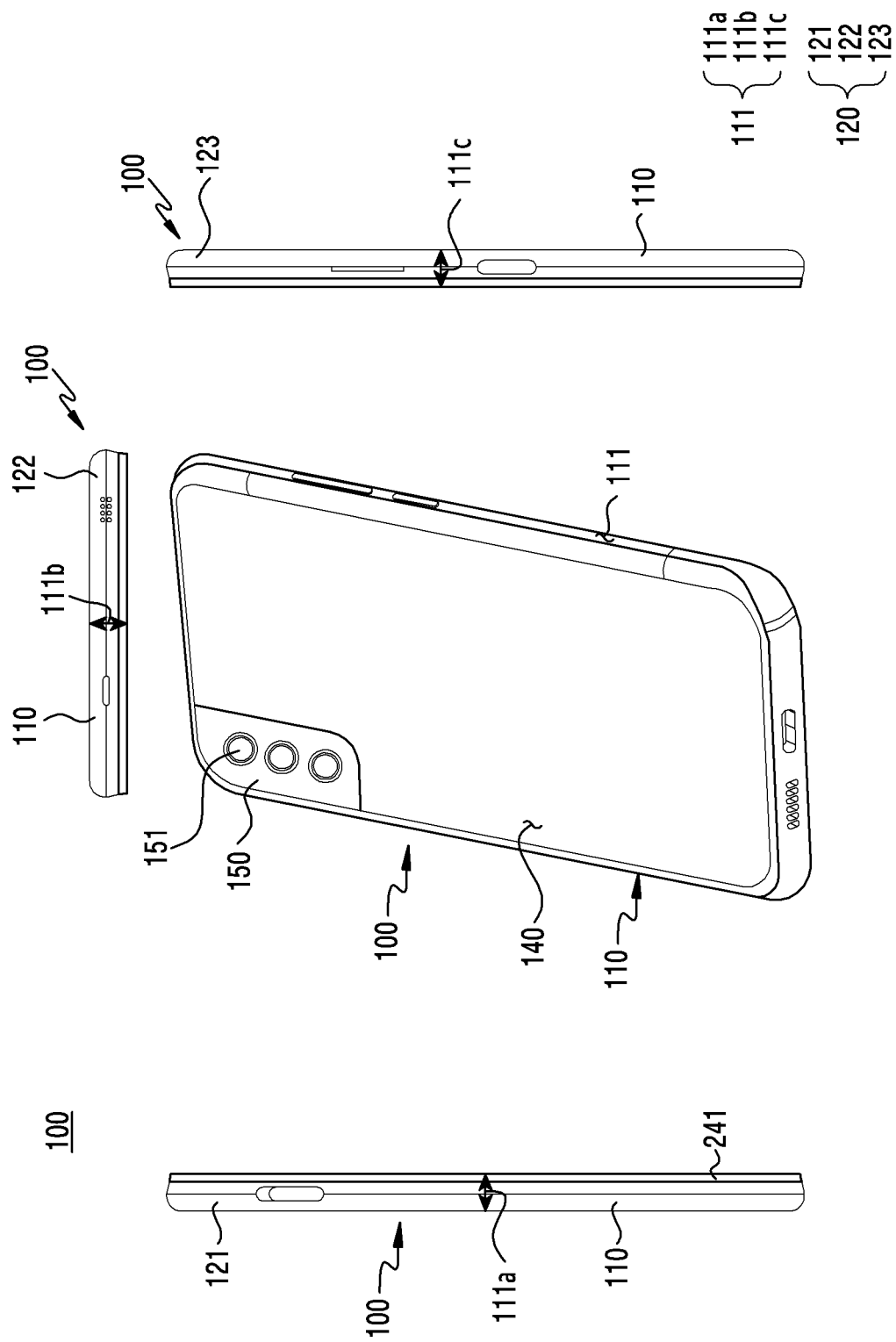
FIG. 1B is a perspective view illustrating a rear surface and a side surface of the electronic device according to an embodiment.

FIG. 1B is a perspective view illustrating a rear surface and a side surface of the electronic device according to an embodiment.

Referring to FIGS. 1A and 1B, the electronic device 100 according to an embodiment may include a housing 110, a display 130 disposed on a front surface of the electronic device 100, a rear surface cover 140 and a camera cover 150.

According to an embodiment, a surface on which the display 130 is disposed may be defined as a front surface of the electronic device 100, and the opposite surface of the front surface may be defined as a rear surface of the electronic device 100. In addition, a surface surrounding a space between the front surface and the rear surface may be defined as a side surface 111 of the electronic device 100. In an embodiment, the housing 110 may include a frame structure 120 which forms the side surface 111 enclosing the space between the display 130 and the rear surface cover 140.

Referring to FIG. 1B, the side surface 111 of the housing 110 according to an embodiment may include a first side surface 111a, a second side surface 111b, and a third side surface 111c.

According to an embodiment, the side surface 111 of the housing 110 may include a corner. For example, the side surface 111 of the housing 110 may include a first corner (not shown) which is formed by the first side surface 111a and the second side surface 111b intersecting each other.

According to an embodiment, the frame structure 120 may include a first frame 121, a second frame 122, and/or a third frame 123. In an embodiment, at least part of the first frame 121, the second frame 122, and/or the third frame 123 may include a conductive material (for example, metal).

According to an embodiment, the frame structure 120 may form at least part of the side surface 111 of the housing 110. For example, the first frame 121 may form at least part of the first side surface 111a of the housing 110. In another example, the second frame 122 may form at least part of the second side surface 111b of the housing 110. In still another example, the third frame 123 may form at least part of the third side surface 111c of the housing 110.

According to an embodiment, the display 130 may occupy most of the front surface of the electronic device 100.

In an embodiment, the display 130 may emit light from pixels to deliver information to a user, and light emitted from the pixels may be transmitted to the outside of the electronic device 100 through the display 130. In an embodiment, the display 130 may include a protection layer such as tempered glass.

According to an embodiment, the rear surface cover 140 may be formed by coated or colored glass, ceramic, a polymer, metal (for example, aluminum, stainless steel, or magnesium), or a combination of at least two of the above-mentioned materials. According to an embodiment, the rear surface cover 140 may include a curved portion that is bent from at least one side end toward the frame structure 120 forming the side surface 111 and is seamlessly extended.

According to an embodiment, the camera cover 150 may form the rear surface of the electronic device 100 along with the rear surface cover 140. In an embodiment, the camera cover 150 may form a part of the first side surface 111a and the second side surface 111b. In an embodiment, the camera cover 150 may include the first corner where the first side surface 111a and the second side surface 111b intersect each other.

According to an embodiment, the camera cover 150 may have at least one camera module (or, camera circuit) (not shown) mounted therein. The at least one camera module may be disposed on the rear surface of the electronic device 100 and may be mounted within the camera cover 150. The above-described at least one camera module may include one or a plurality of lenses, an image sensor, and/or an image signal processor.

According to an embodiment, the camera cover 150 may include a camera hole 151. In an embodiment, the camera module may obtain an image corresponding to light entering through the camera hole 151.

According to an embodiment, the frame structure 120 forming the side surface 111 may be coupled with the rear surface cover 140, and may include metal and/or a polymer. According to an embodiment, the rear surface cover 140 and the frame structure 120 which forms the side surface 111 may be integrally formed with each other and may include the same material (for example, a metallic material such as aluminum).

According to an embodiment, a conductive portion of the frame structure 120 may be electrically connected with a wireless communication circuit to operate as an antenna radiator to transmit and/or receive a radio frequency (RF) signal of a designated frequency band. According to an embodiment, the wireless communication circuit may transmit an RF signal of a designated frequency band to the conductive portion of the frame structure 120, or may receive an RF signal of a designated frequency band from the conductive portion.

The electronic device 100 illustrated in FIGS. 1A and 1B is merely an example, and does not limit the form of the apparatus to which the technical concept of the disclosure is applied. The technical concept disclosed in the present document is applicable to various user devices including a portion operating as an antenna radiator. For example, the technical concept disclosed in the present document may be applied to a foldable electronic device which employs a flexible display and a hinge structure and is foldable in a horizontal direction or foldable in a vertical direction, a tablet or a laptop. In another example, the technical concept disclosed in the present document may be applied to a rollable (or slidable) electronic device which employs a flexible display and a sliding structure and allows the flexible display to be drawn out from the inside of a housing of the electronic device or drawn into the inside of the housing according to a state of the electronic device.

Hereinafter, various embodiments will be described with reference to the electronic device 100 illustrated in FIGS. 1A and 1B for the convenience of explanation.

Figure 2A:
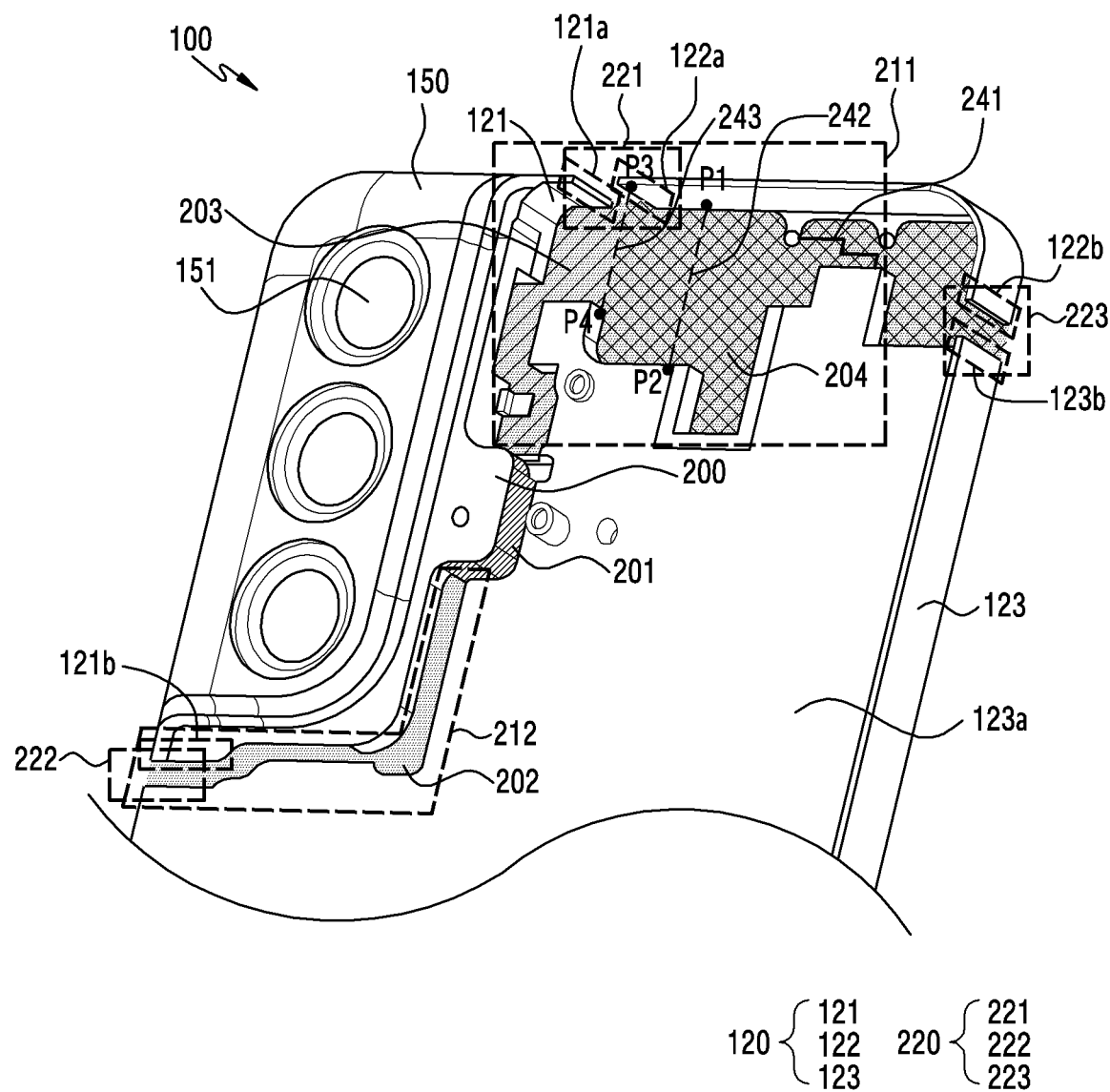
FIG. 2A is a view illustrating an entire slot structure formed by a camera cover and a frame structure of an electronic device according to an embodiment.

FIG. 2A is a view illustrating an entire slot structure which is formed by a camera cover and a frame structure of an electronic device.

Figure 2B:
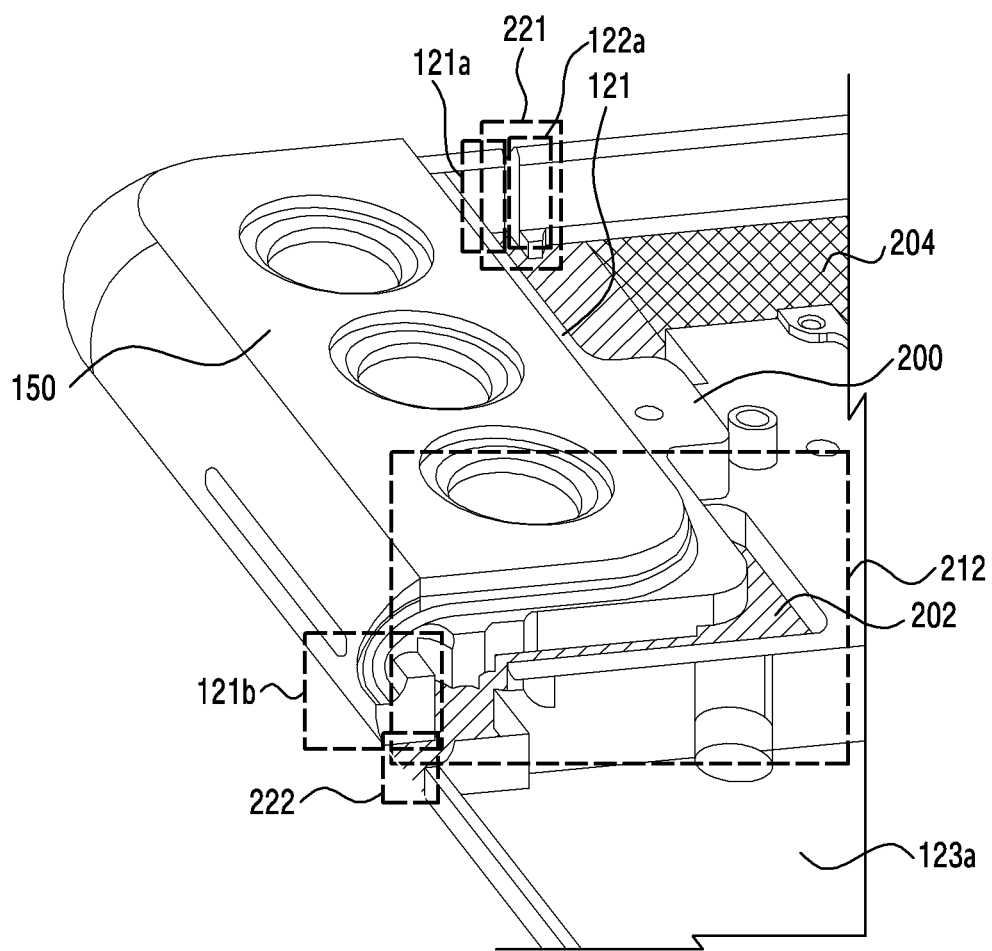
FIG. 2B is a view illustrating a second slot structure as viewed from one side surface of the electronic device according to an embodiment.

FIG. 2B is a view illustrating a second slot structure as viewed from one side surface of the electronic device.

Referring to FIGS. 2A and 2B, the electronic device 100 according to an embodiment may include a first frame 121, a second frame 122, and/or a third frame 123. In an embodiment, the third frame 123 may include a conductive plate 123a.

In another embodiment, the conductive plate 123a may be a separate component which is distinct from the third frame 123. However, the conductive plate 123a will be described as being included in the third frame 123 for the convenience of explanation.

According to an embodiment, the electronic device 100 may include a segment 220 disposed between frame structures 120. In an embodiment, the segment 220 may include a first segment 221, a second segment 222 and/or a third segment 223.

For example, a first end 121a of the first frame 121 and a second end 122a of the second frame 122 may be disposed to be spaced apart from each other by a designated distance or longer, and accordingly, the electronic device 100 may include the first segment 221 between the first end 121a of the first frame 121 and the second end 122a of the second frame 122.

In another example, a third end 121b of the first frame 121 and the conductive plate 123a may be disposed to be spaced apart from each other by a designated distance or longer, and accordingly, the electronic device 100 may include the second segment 222 between the third end 121b of the first frame 121 and the conductive plate 123a.

According to another embodiment, the electronic device 100 may not include the second segment 222. For example, when the third end 121b of the first frame 121 and the conductive plate 123a are connected to a conductive material (for example, metal) on a first side surface 111a, the electronic device 100 may not include the second segment 222.

The segment 220 according to an embodiment may include an injection member. For example, the segment 220 may include an insulating material (for example, ceramic, plastic, a resin).

A part of the camera cover 150 according to an embodiment may be coupled with the first frame 121. According to another embodiment, the camera cover 150 may be integrally formed with the first frame 121.

According to an embodiment, the first frame 121 may include a coupling portion 200, and the coupling portion 200 of the first frame 121 may be physically connected with the conductive plate 123a. In the example illustrated in FIG. 2A, the coupling portion 200 is spaced apart from the conductive plate 123a, but this is for the convenience of explanation. The coupling portion 200 may be physically connected or coupled with the conductive plate 123a. For example, a first area 201 of the coupling portion 200 may be in contact with the conductive plate 123a, and accordingly, the coupling portion 200 of the first frame 121 may be connected with the conductive plate 123a.

According to an embodiment, the first frame 121 may be disposed to be spaced apart from the conductive plate 123a of the third frame 123 with a gap of a designated distance or longer in a second area 202 and a third area 203. In an embodiment, the second frame 122 may be disposed to be spaced apart from the conductive plate 123a with a gap of a designated distance or longer in a fourth area 204.

According to an embodiment, the electronic device 100 may include a first slot structure 211 having a gap of a predetermined direction in a part of the third area 203 and the fourth area 204.

According to an embodiment, the structure of the first slot structure 211 may vary according to a position of a conductive connection member 241, 242, 243. For example, the electronic device 100 may include a first conductive connection member 241, and in this case, the first slot structure 211 may be formed along the first conductive connection member 241.

According to another embodiment, the electronic device 100 may include a second conductive connection member 242, and the second conductive connection member 242 may electrically connect a first point P1 of the second frame 122 and a second point P2 of the conductive plate 123a. In this case, the first slot structure 211 may be formed along the second conductive connection member 242.

According to another embodiment, the electronic device 100 may include a third conductive connection member 243, and the third conductive connection member 243 may electrically connect a third point P3 of the second frame 122 and a fourth point P4 of the conductive plate 123a. In this case, the first slot structure 211 may be formed along the third conductive connection member 243.

According to an embodiment, the structure of the first slot structure 211 may vary according to a position of the conductive connection member 241, 242, 243, and accordingly, an electrical path of the first slot structure 211, which will be described below with reference to FIGS. 5A and 5B, may vary.

According to an embodiment, the electronic device 100 may include a second slot structure 212 having a gap of a predetermined direction in the second area 202.

According to an embodiment, the inside (for example, the third area 203, the fourth area 204) of the first slot structure (or, first slot) 211 may be filled with a dielectric (for example, an injected material, air). Likewise, the inside (for example, the second area 202) of the second slot structure (or, second slot) 212 may be filled with a dielectric.

According to an embodiment, the first slot structure 211 and/or the second slot structure 212 may be an open slot structure (or, open slot). For example, one end of the second slot structure 212 may be extended to the second segment 222 and hence the second slot structure 212 may correspond to an open slot structure.

According to another embodiment, the first slot structure 211 and/or the second slot structure 212 may be a closed slot structure. For example, the third end 121b of the first frame 121 and the conductive plate 123a may be connected by a conductive connection member on the first side surface 111a. In this case, the second slot structure 212 may be a closed slot structure.

Figure 3:
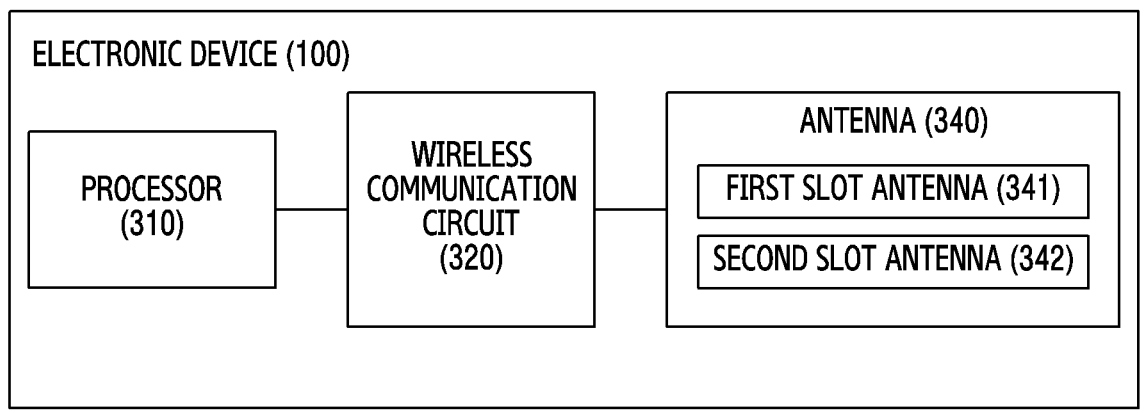
FIG. 3 is a block diagram of an electronic device according to an embodiment.

FIG. 3 is a block diagram of an electronic device according to an embodiment.

The electronic device 100 according to an embodiment may include a processor 310, a wireless communication circuit 320, and/or an antenna 340.

According to an embodiment, a first slot antenna 341 may include a first slot structure 211. In an embodiment, the processor 310 may control the wireless communication circuit 320 to feed power to one point of the first slot structure 211. In this case, the wireless communication circuit 320 may transmit and/or receive a radio frequency (RF) signal of a first frequency band, based on a first electrical path of the first slot structure 211. The first frequency band may vary according to an electrical length of the first electrical path.

According to an embodiment, a second slot antenna 342 may include a second slot structure 212. In an embodiment, the processor 310 may control the wireless communication circuit 320 to feed power to one point of the second slot structure 212. In this case, the wireless communication circuit 320 may transmit and/or receive an RF signal of a second frequency band, based on a second electrical path including the second slot structure 212. The second frequency band may vary according to an electrical length of the second electrical path.

In an embodiment, the antenna 340 may include various types of antenna structures. For example, the antenna 340 may include a patch antenna, a dipole antenna, a monopole antenna, the first slot antenna 341, the second slot antenna 342, a loop antenna, an inverted-F antenna, a planar inverted-F antenna, and/or an antenna structure (or, antenna) of a combination of two or more of the above-mentioned antennas.

The slot structure (or, slot) disclosed in the present document may be substantially referred to as a slit structure or may correspond thereto. In addition, the slot antenna disclosed in the present document may be substantially referred to as a slit antenna or may correspond thereto.

Figure 4A:
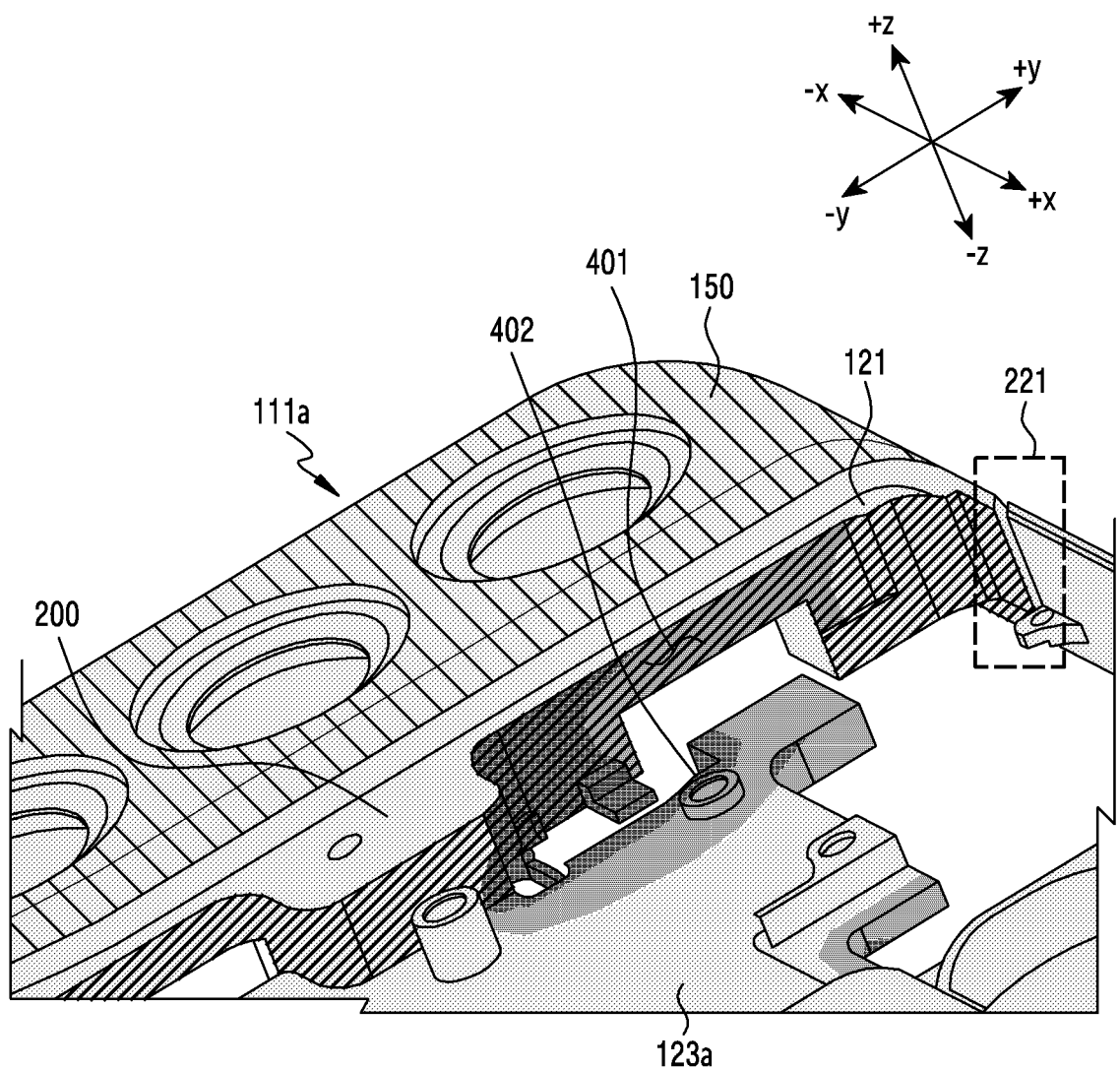
FIG. 4A is a view illustrating a current distribution on a first surface of a first frame and a second surface of a third frame which form a first slot structure of an electronic device according to an embodiment.

FIG. 4A is a view illustrating a current distribution on a first surface of a first frame and a second surface of a third frame which form a first slot structure of an electronic device.

Referring to FIG. 4A, the first frame 121 according to an embodiment may include a first surface 401 which is parallel to a first side surface 111a. In this case, the first surface 401 may refer to a surface that is parallel to a yz plane.

In an embodiment, a conductive plate 123a may include a second surface 402 which is parallel to the first side surface 111a. In an embodiment, the second surface 402 may refer to a surface that is parallel to the yz plane. The same reference numerals may be used for the components which are the same as or substantially the same as the above-described components, and a redundant explanation is omitted.

According to an embodiment, the wireless communication circuit 320 may feed power to one point of the first frame 121 and/or the third frame 123 under control of the processor 310. Accordingly, an electrical path including one area of the first surface 401 of the first frame 121 and/or the second surface 402 of the third frame 123 may be formed. In an embodiment, the wireless communication circuit 320 may transmit and/or receive an RF signal of a designated frequency band, based on the electrical path.

Figure 4B:
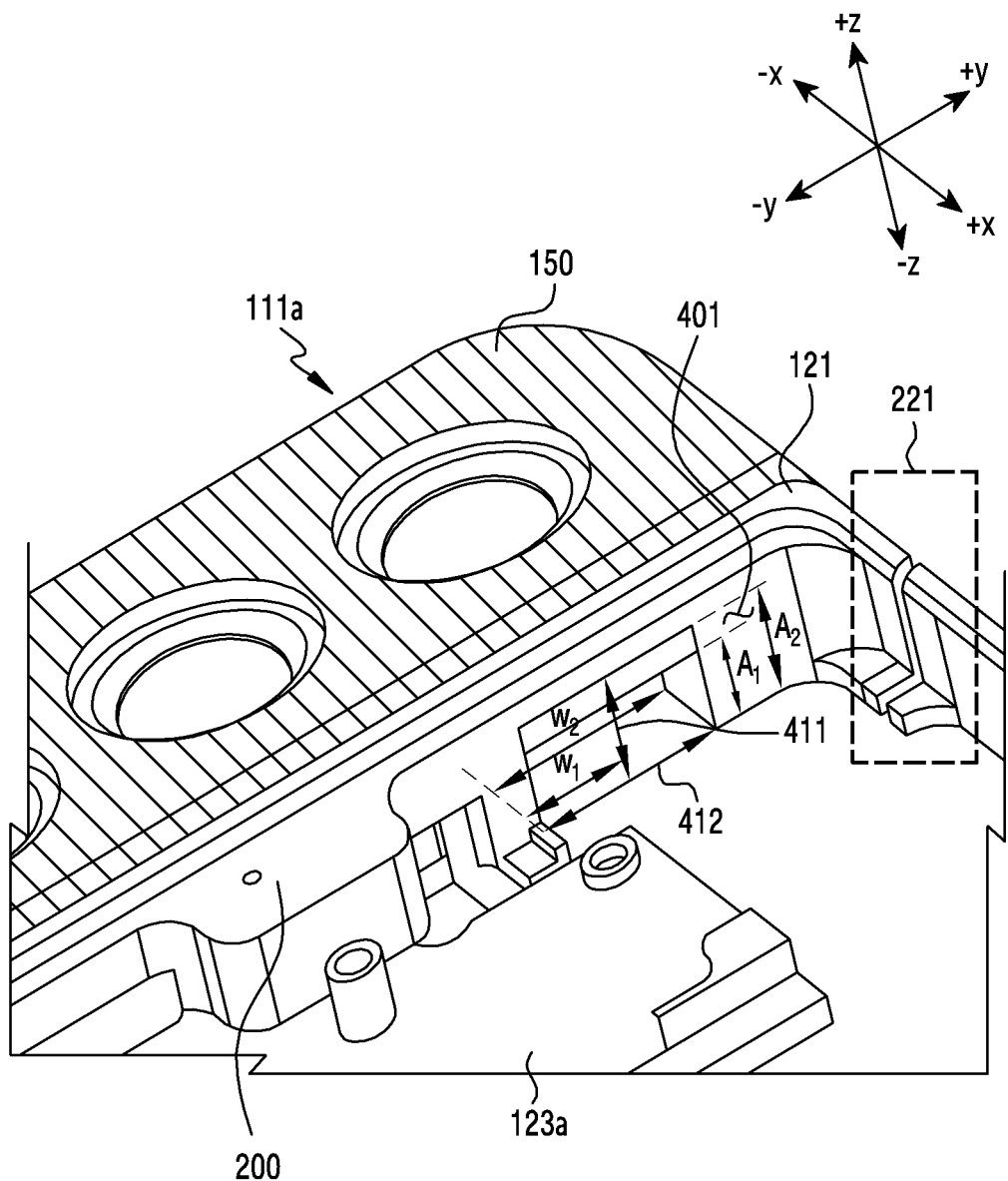
FIG. 4B is a perspective view of the first slot structure of the electronic device which includes a gap in a z-axis direction according to an embodiment.

FIG. 4B is a perspective view of the first slot structure of the electronic device including a gap in a z-axis direction.

Referring to FIG. 4B, the first frame 121 according to an embodiment may include a gap 411 in the z-axis direction which is formed on the first surface 401.

According to an embodiment, a frequency band in which the first slot antenna 341 including the first slot structure 211 transmits and/or receives may vary according to a size of the gap 411 in the z-axis direction. For example, a case in which the gap 411 in the z-axis direction has a first size A1 and a case in which the gap 411 has a second size A2 larger than the first size A1 may be compared. When the gap 411 in the z-axis direction has the second size A2, a capacitance value of a dielectric (for example, air, an injected material) disposed in the gap 411 in the z-axis direction may be smaller than that when the gap 411 has the first size A1. Accordingly, a frequency band in which the first slot antenna 341 having the gap 411 of the second size A2 in the z-axis direction transmits and/or receives may be lower than a frequency band in which the first slot antenna 341 having the gap 411 of the first size A1 in the z-axis direction transmits or receives.

According to an embodiment, the frequency band in which the first slot antenna 341 including the first slot structure 211 transmits or receives may vary according to a width 412 of the gap 411 in the z-axis direction. For example, a case in which the gap 411 in the z-axis direction has a first width W1 and a case in which the gap 411 has a second width W1 larger than the first width W1 may be compared. When the gap 411 in the z-axis direction has the second width W2, a capacitance value of a dielectric (for example, air, an injected material) disposed in the gap 411 in the z-axis direction may be larger than that when the gap 411 has the first width W1. Accordingly, a frequency band in which the first slot antenna 341 having the gap 411 of the second width W2 in the z-axis direction transmits and/or receives may be higher than a frequency band in which the first slot antenna 341 having the gap 411 of the first width W1 in the z-axis direction transmits and/or receives.

According to an embodiment, optimized impedance matching may be implemented in a frequency band in which the first slot antenna 341 operates, by adjusting a size and/or a width of the gap 411 in the z-axis direction.

According to another embodiment, the gap in the z-axis direction may be formed not only on the first surface 401 of the first frame 121 but also on the second surface 402 of the conductive plate 123a. In an embodiment, optimized impedance matching may be implemented in a frequency band in which the first slot antenna 341 operates, by adjusting a size and/or a width of the gap in the z-axis direction which is formed on the second surface 402. In FIG. 4B, the gap 411 in the z-axis direction is formed in one area that is positioned in the +y direction with reference to the coupling portion 200 on the first surface 401 of the first frame 121, but this should not be considered as limiting. According to a certain embodiment, the gap in the z-axis direction may be formed in one area that is positioned in the −y direction with reference to the coupling portion 200 on the first surface 401 of the first frame 121.

Figure 4C:
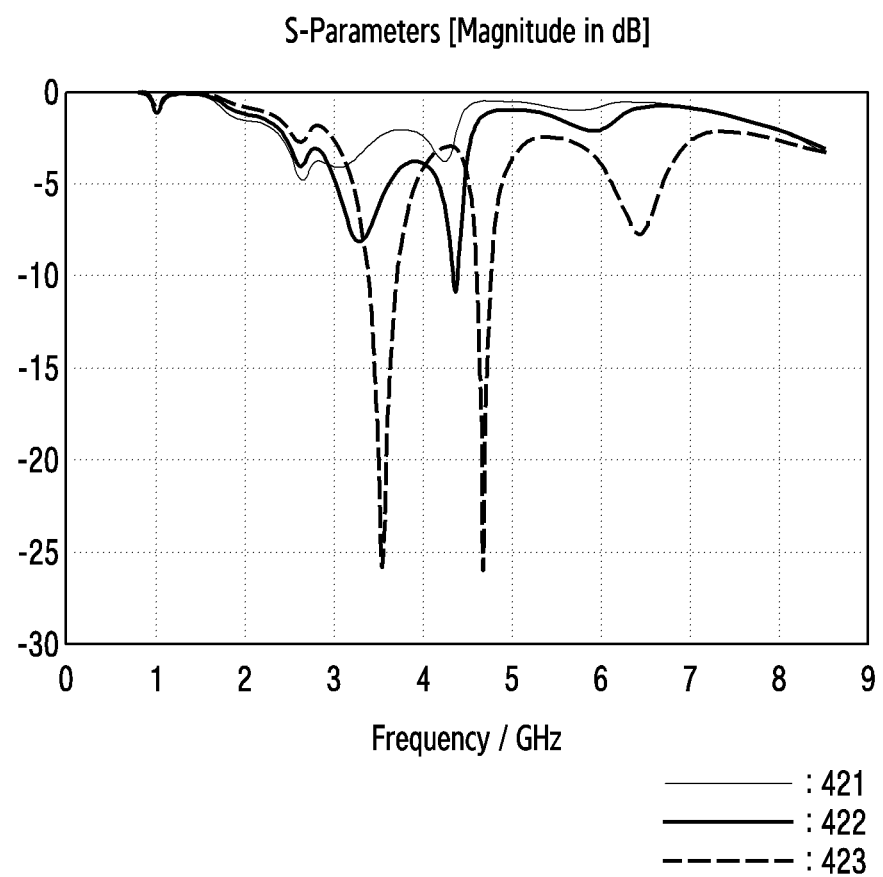
FIG. 4C is a view illustrating a reflection coefficient graph with a change in the gap of the first slot structure in the z-axis direction according to an embodiment.

FIG. 4C is a view illustrating a reflection coefficient graph with a change in the gap of the first slot structure in the z-axis direction.

Referring to FIG. 4C, the first surface 401 of the first frame 121 according to an embodiment may include the gap 411 in the z-axis direction. In an embodiment, the reflection coefficient graph of the first slot antenna 341 including the first slot structure 211 of the electronic device 100 may vary according to a difference in the size of the gap 411 in the z-axis direction.

FIG. 4C illustrates an antenna reflection coefficient graph 421 in case that the size of the gap in the z-axis direction is 1.5 mm, an antenna reflection coefficient graph 422 in case that the size of the gap in the z-axis direction is 3 mm, and an antenna reflection coefficient graph 423 in case that the size of the gap in the z-axis direction is 4 mm. Hereinafter, the antenna reflection coefficient graphs may be referred to as a first graph 421, a second graph 422, and a third graph 423 in sequence.

According to an embodiment, the first graph 421 may have an S11 value of about −5 dB at a frequency of about 2.6 GHz, and the first graph 421 may have an S11 value of about −4 dB at a frequency of about 4.3 GHz. In an embodiment, the first slot antenna 341 when the size of the gap in the z-axis direction is 1.5 mm may transmit or receive an RF signal in a frequency band of about 2.6 GHz and about 4.3 GHz.

According to an embodiment, the second graph 422 may have an S11 value of about −7 dB at a frequency of about 3.3 GHz, and may have an S11 value of about −10 dB at a frequency of about 4.4 GHz. In an embodiment, the first slot antenna 341 when the size of in the z-axis direction is 3 mm may transmit or receive an RF signal in a frequency band of about 3.3 GHz and about 4.4 GHz.

According to an embodiment, the third graph 423 may have an S11 value of −25 dB at a frequency of about 3.5 GHz, and may have an S11 value of about −25 dB at a frequency of about 4.7 GHz. In an embodiment, the first slot antenna 341 when the size of in the z-axis direction is 4.5 mm may transmit or receive an RF signal in a frequency band of about 3.5 GHz and about 4.7 GHz.

According to an embodiment, it may be seen that, as the size of the gap 411 in the z-axis direction increases, the frequency band in which the first slot antenna 341 transmits or receives increases. This is because an increase of a capacitance of a dielectric (for example, air, an injected material) disposed in the gap 411 in the z-axis direction is attributable to an increase of the size of the gap 411 of the z-axis direction.

According to an embodiment, optimal impedance matching may be implemented in a frequency band in which the first slot antenna 341 operates by adjusting the size of the gap 411 in the z-axis direction. In an embodiment, the size of the gap 411 in the z-axis direction is not limited to 1.5 mm, 3 mm, and 4.5 mm, and may vary according to a desired frequency band in which the first slot antenna 341 is to operate.

According to an embodiment, the gap 411 in the z-axis direction may have a designated size or larger in order to ensure radiation performance of the first slot antenna 341. In an embodiment, when the electronic device 100 includes the gap of the designated size or larger in the z-axis direction on the first surface 401 of the first frame 121, the radiation performance of the first slot antenna 341 may be enhanced.

Figure 5A:
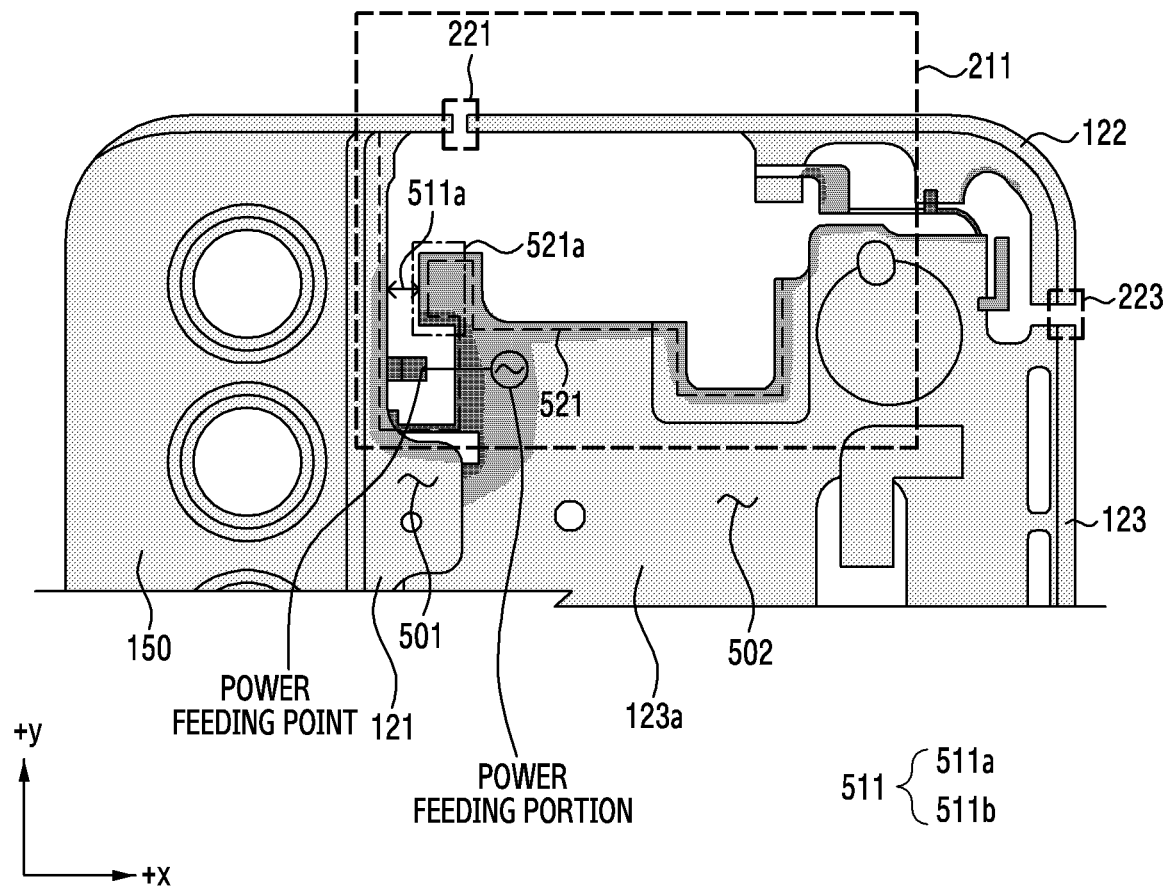
FIG. 5A is a view illustrating a current distribution on a third surface of a first frame and a fourth surface of a third frame which form a first slot structure of an electronic device according to an embodiment.

FIG. 5A is a view illustrating a current distribution on a third surface of a first frame and a fourth surface of a conductive plate which form a first slot structure of an electronic device.

Referring to FIG. 5A, the first frame 121 according to an embodiment may include a third surface 501 which is perpendicular to a first side surface (for example, the first side surface 111a of FIG. 1B) and a second side surface (for example, the second side surface 111b of FIG. 1B). In an embodiment, a conductive plate 123a of a third frame 123 may include a fourth surface 502 which is perpendicular to the first side surface 111a and the second side surface 111b. The same reference numerals may be used for the components which are the same as or substantially the same as the above-described components, and a redundant explanation is omitted.

According to an embodiment, the first slot structure 211 may have a gap 511a of a first size in an x-axis direction (for example, the x-axis direction of FIG. 4A).

According to an embodiment, a wireless communication circuit 320 may feed power to one point of the first frame 121, thereby forming a first electrical path 521 of the first slot structure 211 in one area of the third surface 501 and the fourth surface 502. In an embodiment, the wireless communication circuit 320 may transmit and/or receive an RF signal of a first frequency band, based on the first electrical path 521.

According to an embodiment, the first electrical path 521 of the first slot structure 211 may have a first electrical length L1. The first electrical path L1 may vary through a physical length of the first slot structure 211, a lumped element (for example, a capacitor, an inductor) and/or an impedance matching circuit.

Figure 5B:
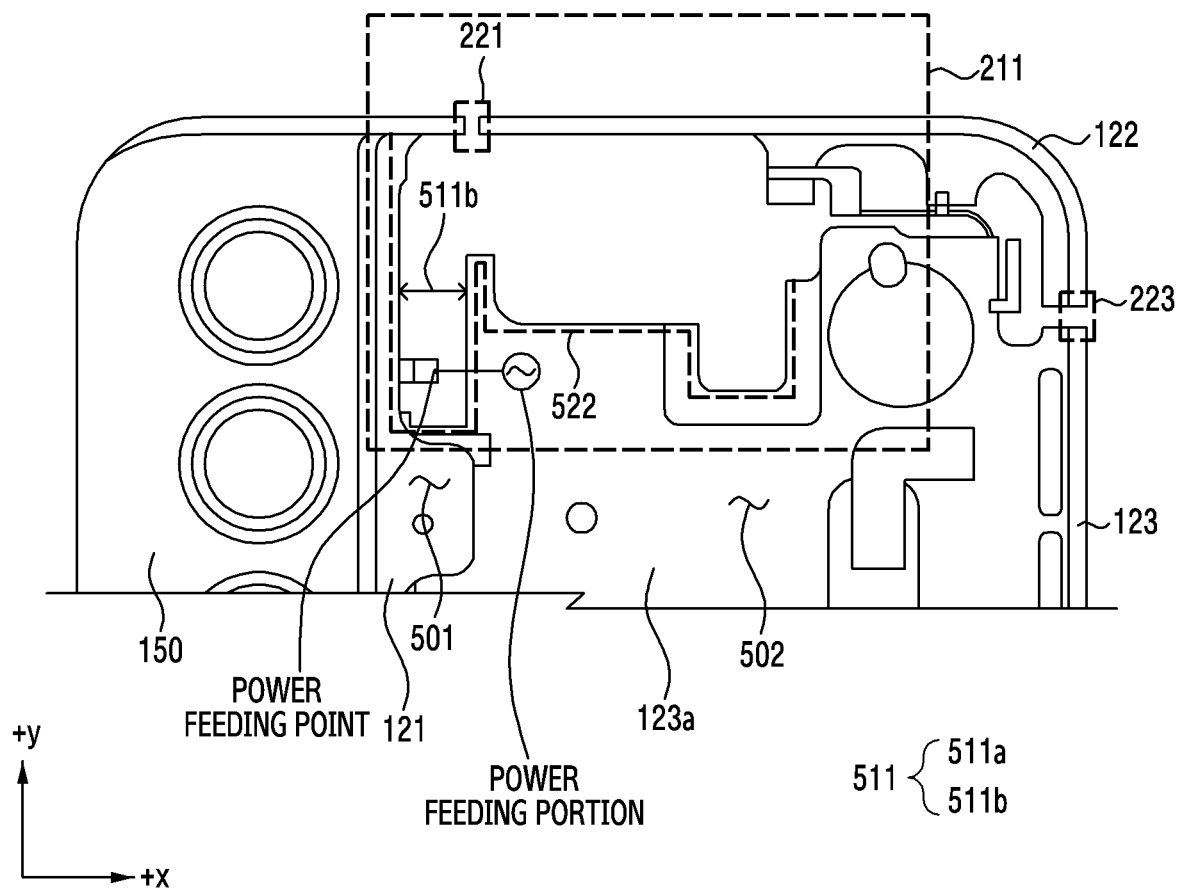
FIG. 5B is a view illustrating the first slot structure of the electronic device including a gap in an x-axis direction according to an embodiment.

FIG. 5B is a view illustrating a first slot structure including a gap of a second size in the x-axis direction.

Referring to FIG. 5B, the first slot structure 211 according to an embodiment may have a gap 511b of the second size which is larger than the first size in the x-axis direction.

According to an embodiment, the wireless communication circuit 320 may feed power to one point of the first frame 121, thereby forming a second electrical path 522 of the first slot structure 211 in one area of the third surface 501 and/or the fourth surface 502. In an embodiment, an electrical length of the second electrical path 522 may have a second electrical length L2 which is shorter than the first electrical length L1. For example, the first electrical path 521 of FIG. 5A may further include a first portion 521a compared to the second electrical path 522 of FIG. 5B. Accordingly, the electrical length of the second electrical path 522 may have the second electrical path L2 which is shorter than the first electrical path L1.

In an embodiment, the second electrical length L2 of the second electrical path 522 may be adjusted through the lumped element or the impedance matching circuit, in addition to the physical length of the first slot structure 211, and the second electrical length L2 may be longer than the first electrical length L1. However, it will be described that the second electrical path L2 is shorter than the first electrical length L1, based on the physical length of the first slot structure 211 for the convenience of explanation.

In an embodiment, the wireless communication circuit 320 may transmit and/or receive an RF signal of a second frequency band which is lower than the first frequency band, based on the second electrical path 522.

According to an embodiment, a frequency band in which the first slot antenna 341 including the first slot structure 211 operates may vary by adjusting the size of the gap in the x-axis direction.

Figure 5C:
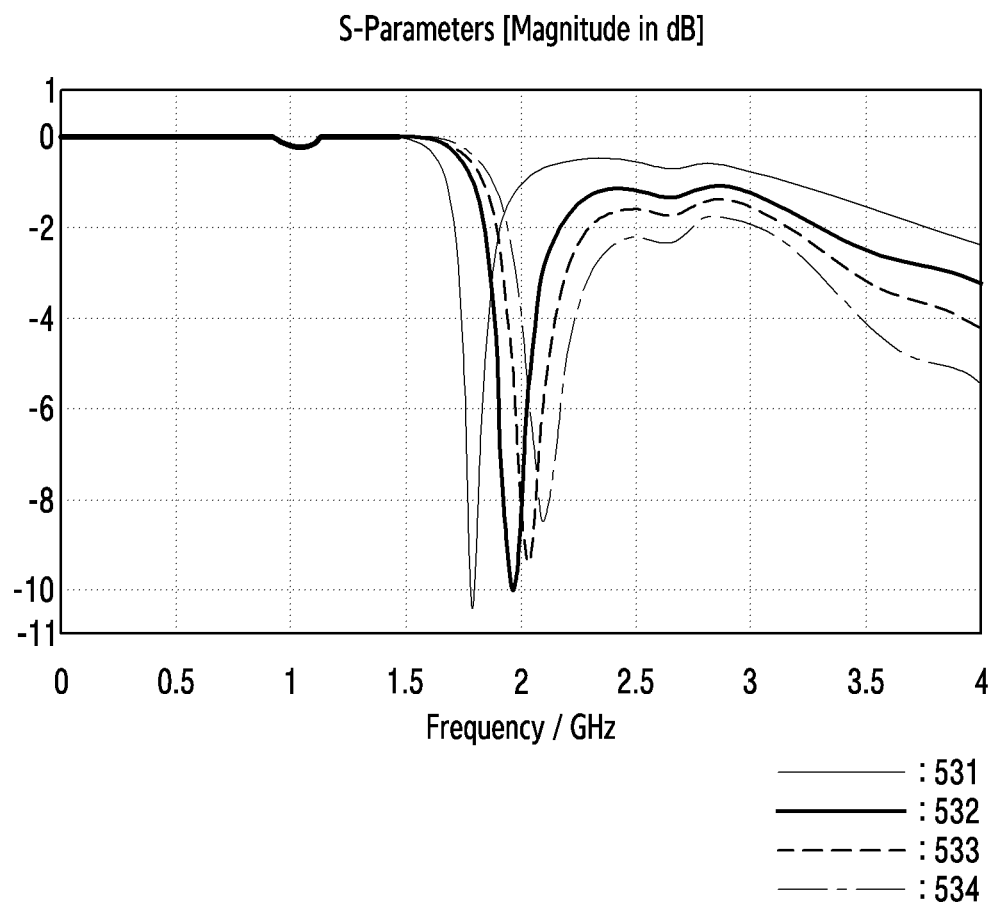
FIG. 5C is a view illustrating a reflection coefficient graph with a change in the gap of the first slot structure in the x-axis direction according to an embodiment.

FIG. 5C is a view illustrating a reflection coefficient graph with a change in the gap of the first slot structure in the x-axis direction.

Referring to FIG. 5C, the reflection coefficient graph of the first slot antenna 341 may vary according to a difference in the size of the gap 511 of the first slot structure in the x-axis direction in an embodiment.

According to an embodiment, a first reflection coefficient graph 531 is a reflection coefficient graph of the first slot antenna 341 when the size of the gap 511 in the x-axis direction is 3 mm. A second reflection coefficient graph 532 is a reflection coefficient graph of the first slot antenna 341 when the size of the gap 511 in the x-axis direction is 4 mm. A third reflection coefficient graph 533 is a reflection coefficient graph of the first slot antenna 341 when the size of the gap 511 in the x-axis direction is 5 mm. A fourth reflection coefficient graph 534 is a reflection coefficient graph of the first slot antenna 341 when the size of the gap 511 in the x-axis direction is 6 mm. According to an embodiment, the first reflection coefficient graph 531 may have an S11 value of about −10 dB at a frequency of about 1.75 GHz. The second reflection coefficient graph 532 may have an S11 value of about −10 dB at a frequency of about 1.9 GHz. The third reflection coefficient graph 533 may have an S11 value of about −9 dB at a frequency of about 2.1 GHz. The fourth reflection coefficient graph 534 may have an S11 value of about −8 dB at a frequency of about 2.2 GHz.

According to an embodiment, as the size of the gap 511 in the x-axis direction increases, a frequency band in which the reflection coefficient value of the first slot antenna 341 reaches a minimum increases in the reflection coefficient graph 531, 532, 533, 534. In an embodiment, when the size of the gap 511 in the x-axis direction increases, the length of the electrical path of the first slot structure 211 may be reduced, and hence, the frequency band in which the reflection coefficient value of the first slot antenna 341 reaches a minimum may increase.

Figure 6A:
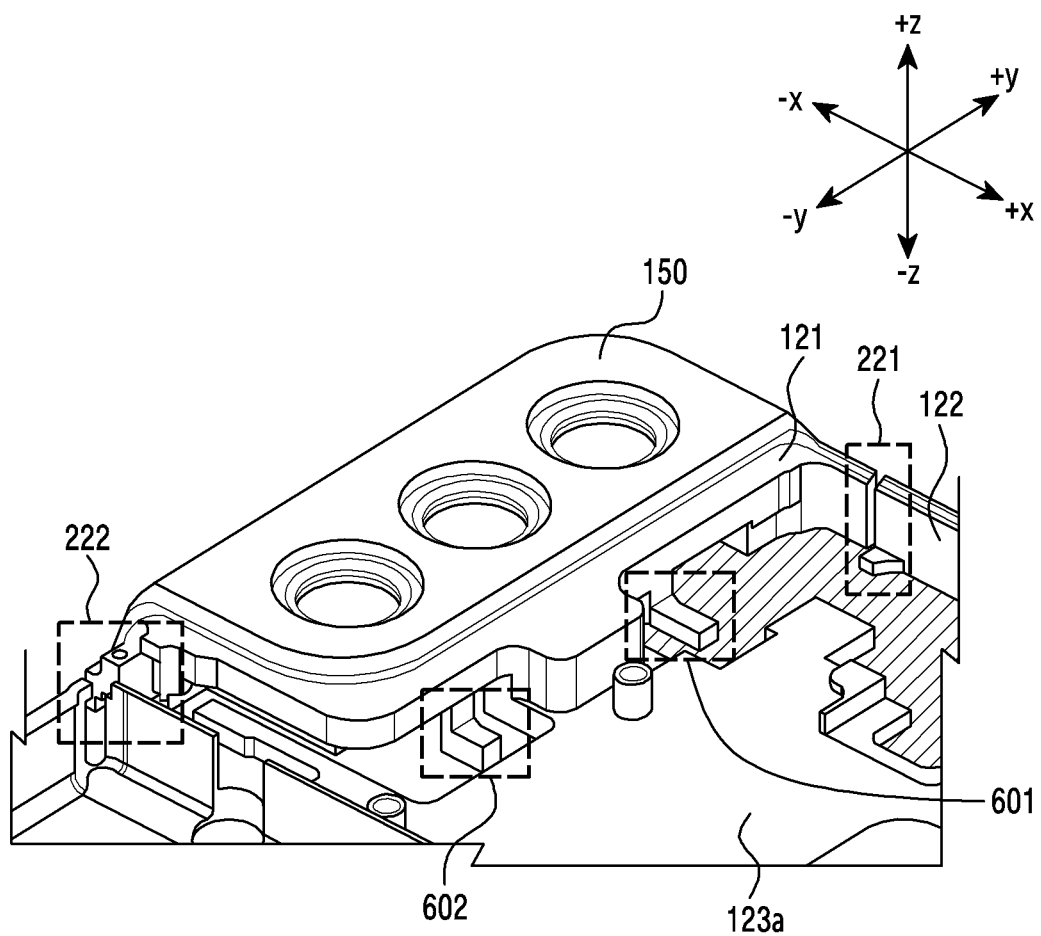
FIG. 6A is a view illustrating a first contact structure and a second contact structure for feeding power to a frame structure according to an embodiment.

FIG. 6A is a view illustrating a first contact structure (or, first contact, or first contact member) and a second contact structure (or, second contact, or second contact member) for feeding power to a frame structure.

Figure 6B:
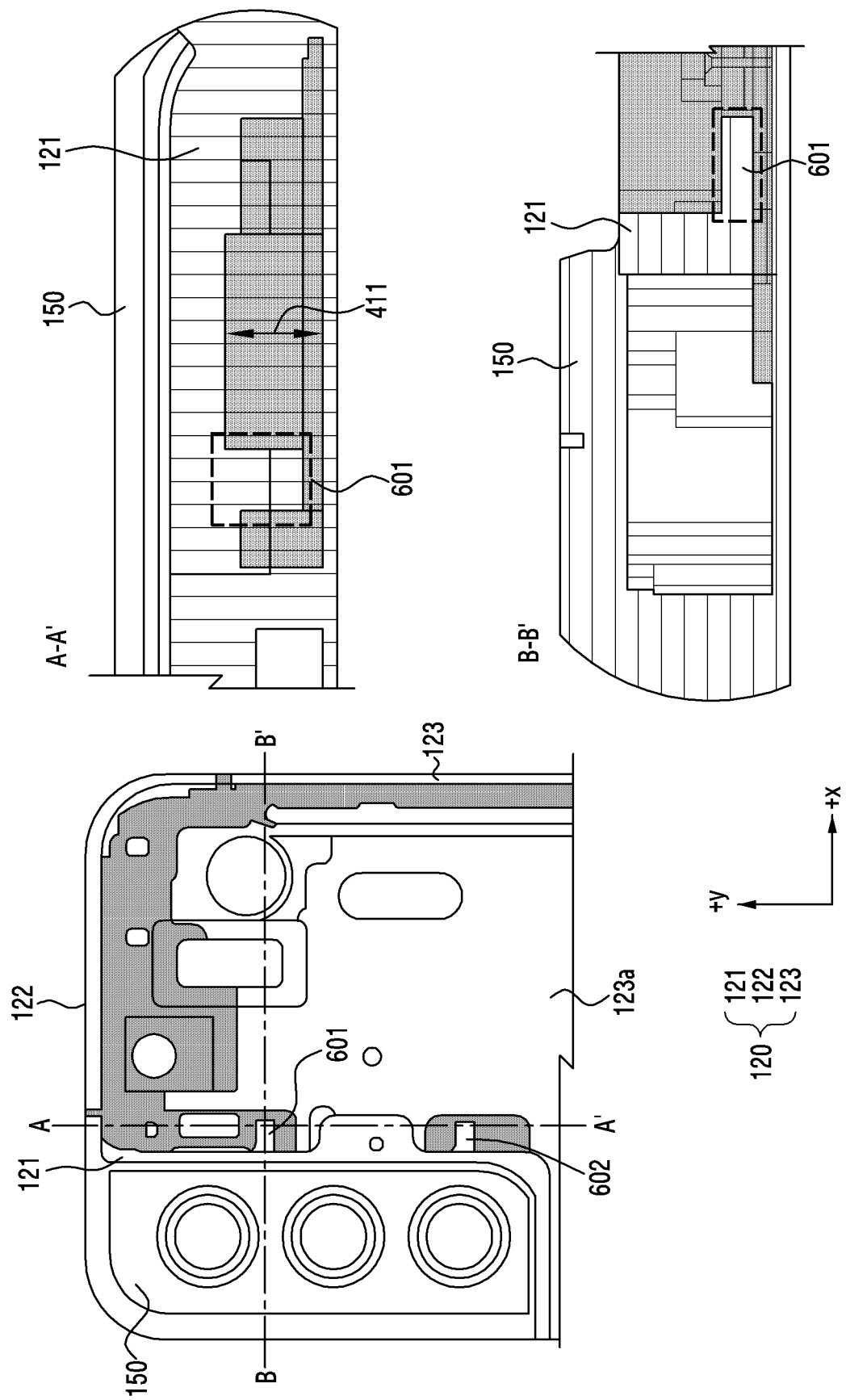
FIG. 6B is a rear surface view and a cross-sectional view of the electronic device illustrating the first contact structure and the second contact structure according to an embodiment.

FIG. 6B is a rear surface view of the electronic device illustrating the first contact structure and the second contact structure, and a cross-sectional view of the electronic device.

Referring to FIGS. 6A and 6B, the electronic device 100 according to an embodiment may include a first contact structure 601 and/or a second contact structure 602 which is coupled with a first frame 121. In an embodiment, a wireless communication circuit 320 may feed power to one point of the first contact structure 601 and/or the second contact structure 602.

According to another embodiment, the first contact structure 601 and/or the second contact structure 602 may be replaced with a protrusion which is extended from the first frame 121. For example, a first protrusion may be extended from the first frame 121 and may be formed in a direction (+x direction) toward a third frame 123. In an embodiment, the wireless communication circuit 320 may feed power to one point of the first protrusion.

According to an embodiment, the electronic device 100 may include a printed circuit board (PCB), which will be described below with reference to FIG. 7, and the wireless communication circuit 320 disposed on the PCB may feed power to one point of the first contact structure 601 and/or the second contact structure 602 through a conductive connection member (for example, a C-clip and/or a pogo pin) which connects the PCB and the first contact structure 601 and/or the second contact structure 602.

In another embodiment, a second frame 122 and/or a conductive plate 123*a* may include a plurality of contact structures for feeding power. For example, the conductive plate 123*a* may include a plurality of contact structures which are extended from a portion of the conductive plate 123*a* toward the first frame 121. In an embodiment, the wireless communication circuit 320 may feed power to the plurality of contact structures.

The first contact structure 601 and/or the second contact structure 602 according to an embodiment may be formed with a conductive material. For example, the first contact structure 601 and the second contact structure 602 may be formed with metal (for example, copper, aluminum).

Figure 7A:
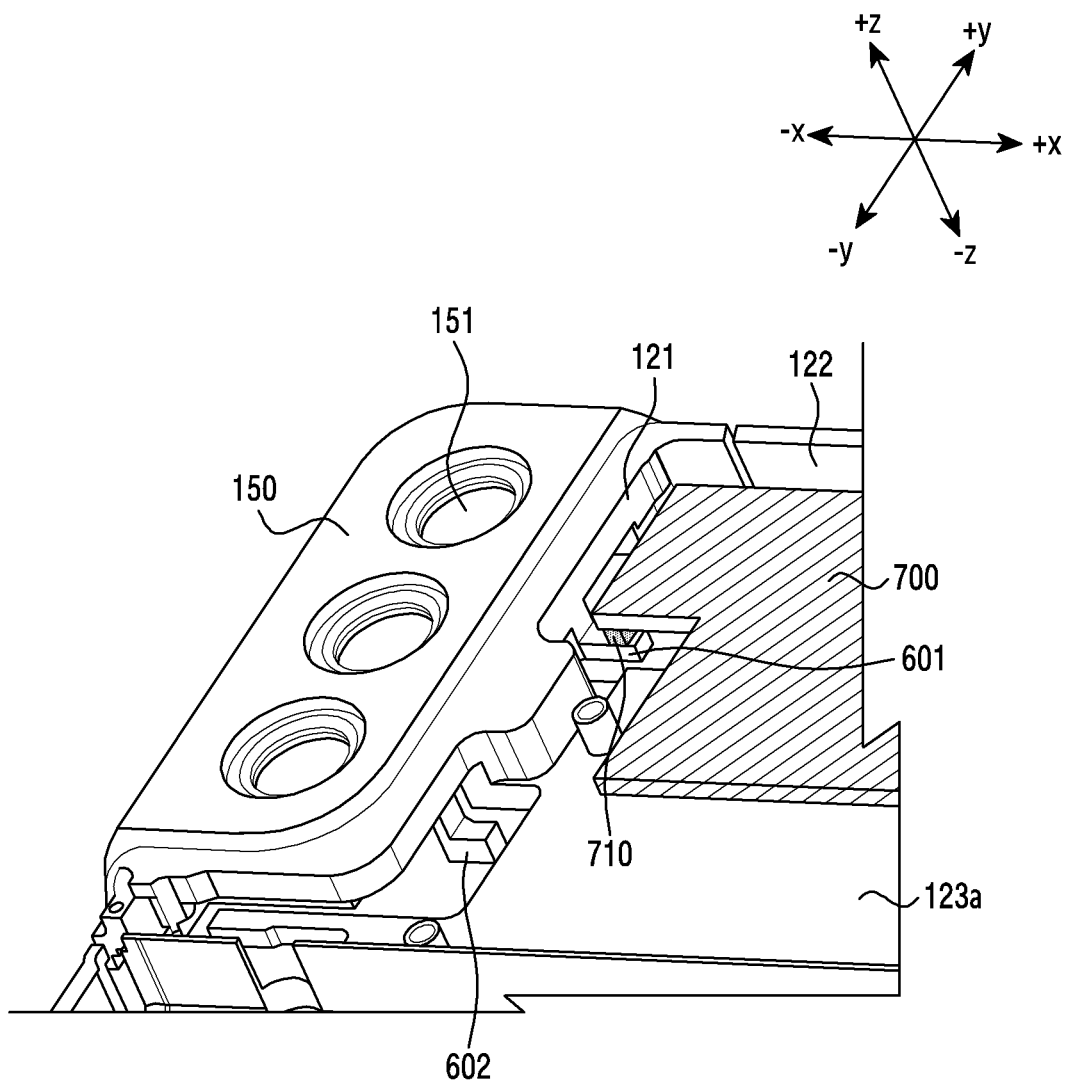
FIG. 7A is a view illustrating a power feeding structure by a wireless communication circuit included in a printed circuit board disposed in a +z direction of a first contact structure among power feeding structures of a slot antenna according to an embodiment.

FIG. 7A illustrates a power feeding structure by a wireless communication circuit included in a printed circuit board disposed in a +z direction of a first contact structure among power feeding structures of a slot antenna according to an embodiment.

Figure 7B:
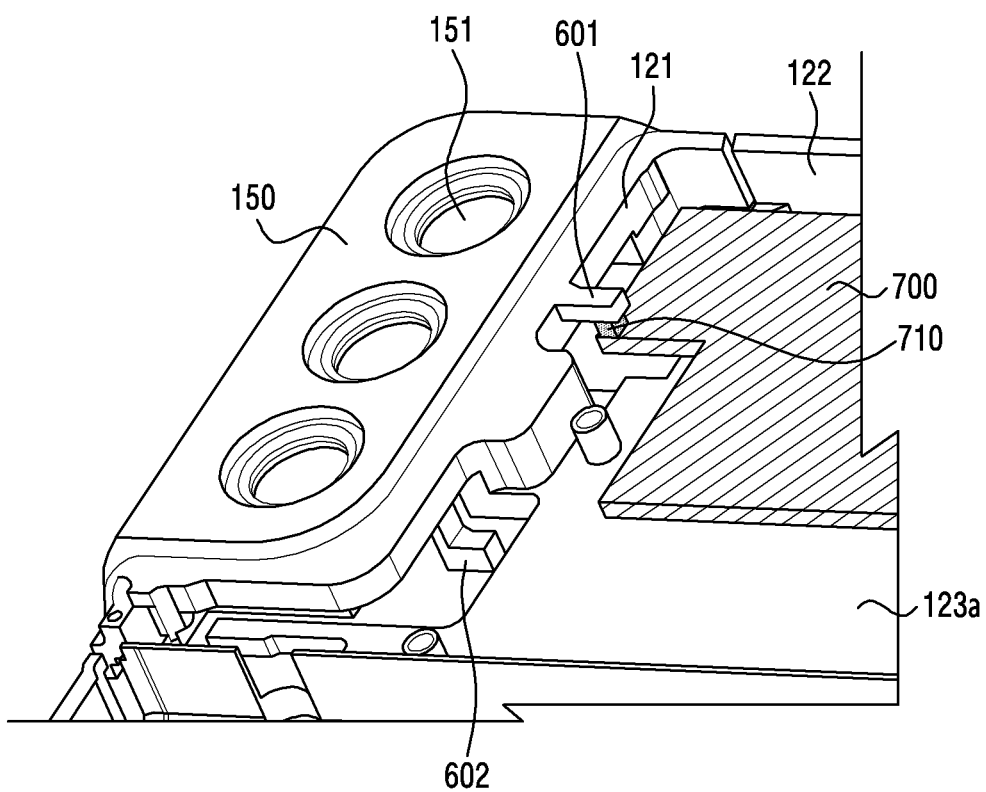
FIG. 7B is a view illustrating a power feeding structure by a wireless communication circuit included in a printed circuit board disposed in a −z direction of the first contact structure among the power feeding structures of the slot antenna according to an embodiment.

FIG. 7B illustrates a power feeding structure by a wireless communication circuit included in a printed circuit board disposed in a -z direction of the first contact structure among the power feeding structures of the slot antenna according to an embodiment.

Figure 7C:
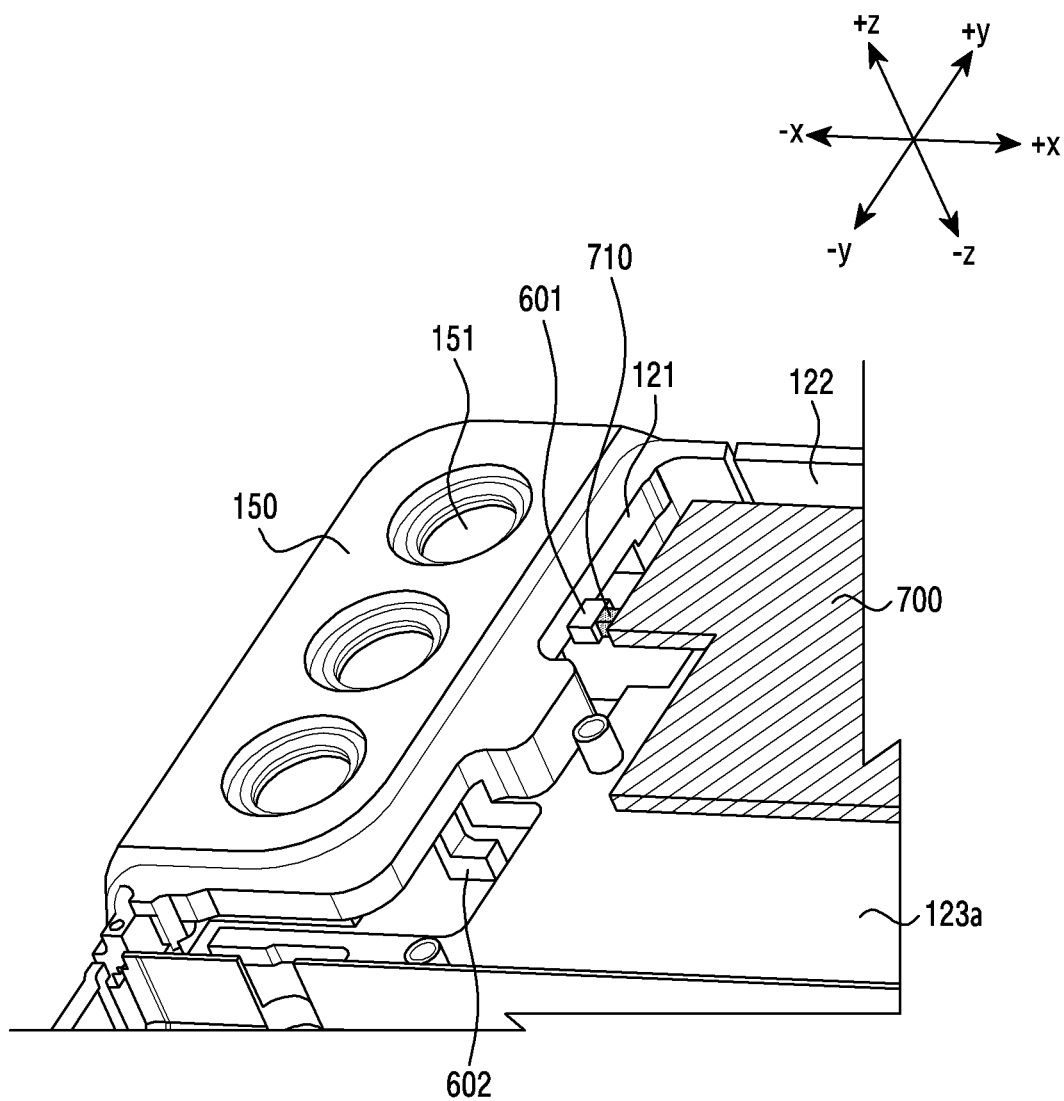
FIG. 7C is a view illustrating a power feeding structure by a wireless communication circuit included in a printed circuit board disposed in a +x direction of the first contact structure among the power feeding structures of the slot antenna according to an embodiment.

FIG. 7C illustrates a power feeding structure by a wireless communication circuit included in a printed circuit board disposed in a +x direction of the first contact structure among the power feeding structures of the slot antenna according to an embodiment.

Referring to FIGS. 7A, 7B, and 7C, the electronic device 100 may include a printed circuit board 700. The same reference numerals may be used for the components which are the same as or substantially the same as the above-described components, and a redundant explanation is omitted.

According to an embodiment, a plurality of electronic components may be disposed on the printed circuit board 700. In an embodiment, a wireless communication circuit (for example, the wireless communication circuit 320 of FIG. 3), a processor (for example, the processor 310 of FIG. 3), a memory, and/or an interface may be disposed on the printed circuit board 700. In an embodiment, the printed circuit board 700 may include a conductive layer.

According to an embodiment, the printed circuit board 700 may be electrically connected with a first contact structure 601. For example, the printed circuit board 700 may be electrically connected through a conductive connection member (for example, a C-clip, a side clip, a pogo pin) 710. In another example, the printed circuit board 700 may be electrically connected with the first contact structure 601 in direct contact therewith.

According to another embodiment, the printed circuit board 700 may be electromagnetically connected with the first contact structure 601 through a coupling method. In an example, the printed circuit board 700 may be disposed adjacent to the first contact structure 601 within a designated distance therefrom, and in this case, the printed circuit board 700 may be electromagnetically connected with the first contact structure 601.

Referring to FIG. 7A, the printed circuit board 700 according to an embodiment may be disposed in the +z direction of the first contact structure 601. In an embodiment, the wireless communication circuit 320 disposed on the printed circuit board 700 may feed power to one point of the first contact structure 601 disposed in the -z direction from the printed circuit board 700.

Referring to FIG. 7B, the printed circuit board 700 according to an embodiment may be disposed in the -z direction of the first contact structure 601. In an embodiment, the wireless communication circuit 320 disposed on the printed circuit board 700 may feed power to one point of the first contact structure 601 disposed in the +z direction from the printed circuit board 700.

Referring to FIG. 7C, the printed circuit board 700 according to an embodiment may be disposed in the +x direction of the first contact structure 601. In an embodiment, the wireless communication circuit 320 disposed on the printed circuit board 700 may feed power to one point of the first contact structure 601 disposed in the -x direction from the printed circuit board 700.

Figure 8:
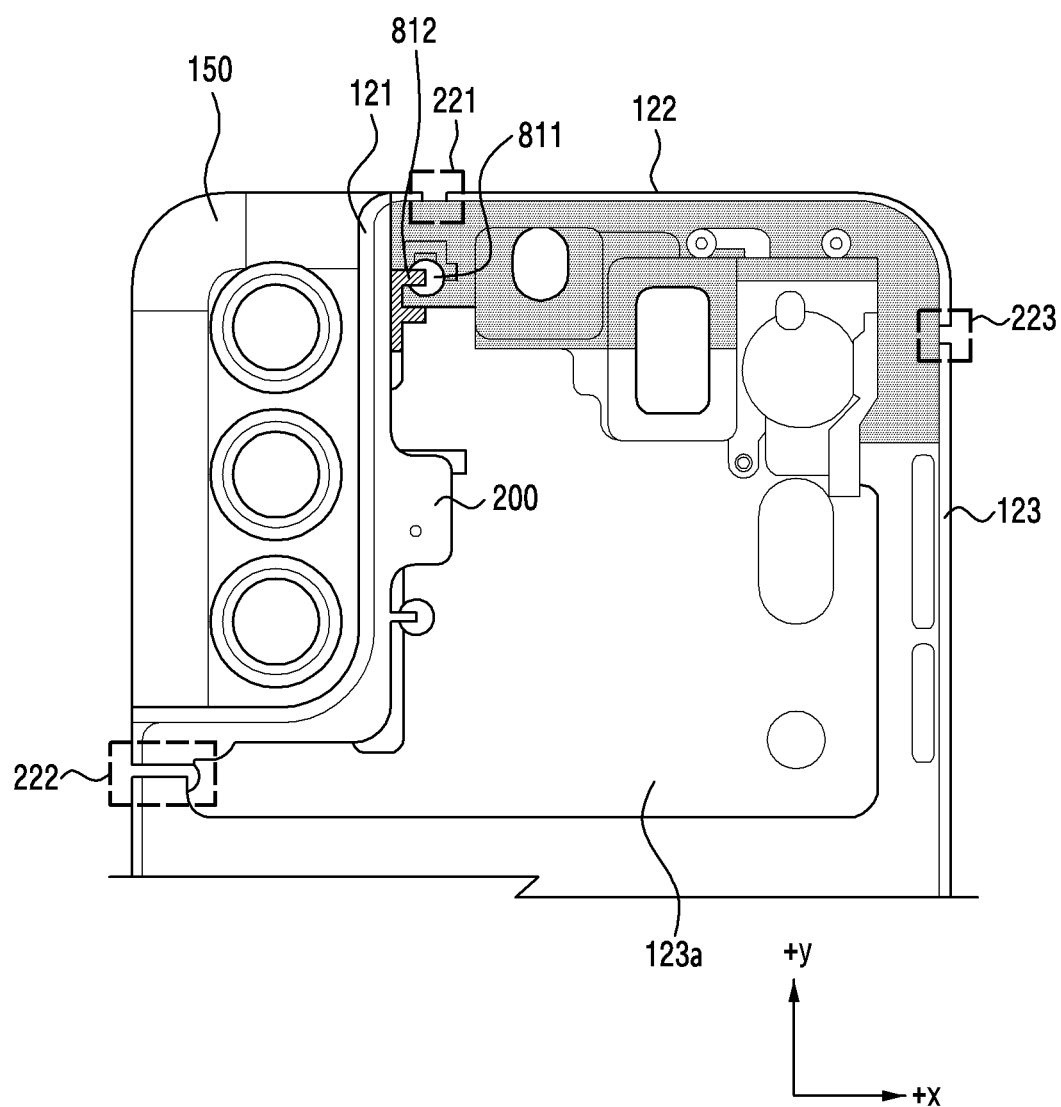
FIG. 8 is a view illustrating a power feeding structure using a conductive pattern among feeding structures of a slot antenna according to an embodiment.

FIG. 8 illustrates a power feeding structure using a conductive pattern among power feeding structures (or, feeding member, conductive material for feeding) of a slot antenna according to an embodiment.

Referring to FIG. 8, the electronic device 100 according to an embodiment may include a conductive pattern 812.

According to an embodiment, a wireless communication circuit 320 may feed power to a slot structure which is formed by a first frame 121 and/or a conductive plate 123*a* through a conductive pattern 812 in replacement of the first contact structure 601 and/or the second contact structure 602. For example, the wireless communication circuit 320 may feed power from a first point 811 of the conductive pattern 812 to the first frame 121. In another example, the wireless communication circuit 320 may feed power from the first point 811 of the conductive pattern 812 to the conductive plate 123*a*.

According to another embodiment, the electronic device 100 may include a conductive pattern which is formed inside or outside a coupling portion 200. In this case, the wireless communication circuit 320 may feed power from one point of the conductive pattern to the first frame 121 and/or the conductive plate 123*a*.

According to an embodiment, the conductive pattern 812 may be formed by a laser direction structuring (LDS) method. However, this should not be considered as limiting, and the conductive pattern 812 may be implemented in various methods (for example, vapor deposition and/or stainless steel (STS)). According to another embodiment, the electronic device 100 may include a flexible printed circuit board, and the conductive pattern 812 may be replaced with the flexible printed circuit board.

Figure 9:
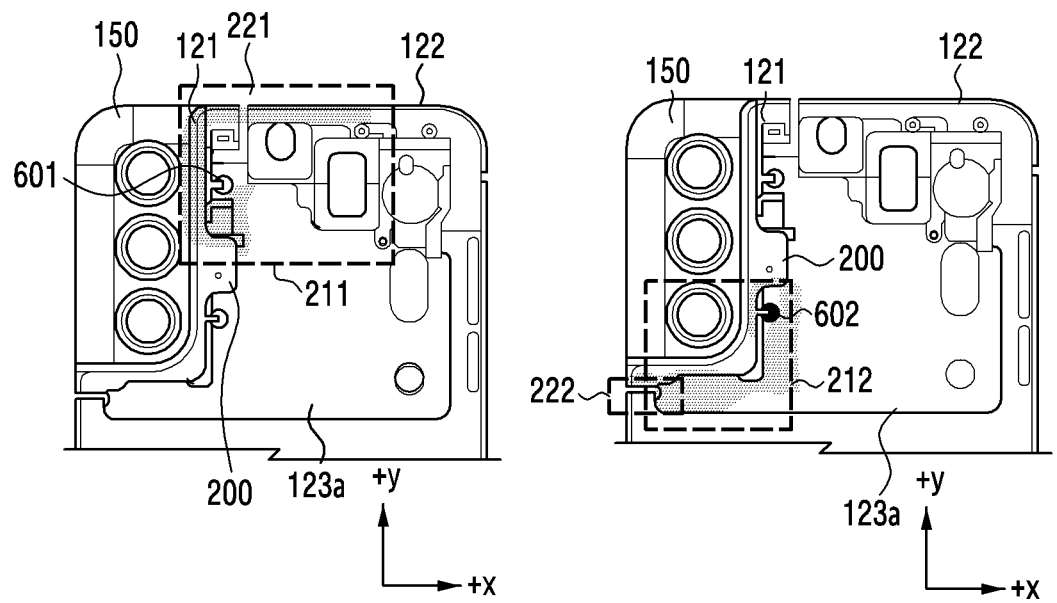
FIG. 9 is a view illustrating a current distribution of a first slot structure, a current distribution of a second slot structure, and a reflection coefficient graph of a slot antenna according to an embodiment.
Figure 9:
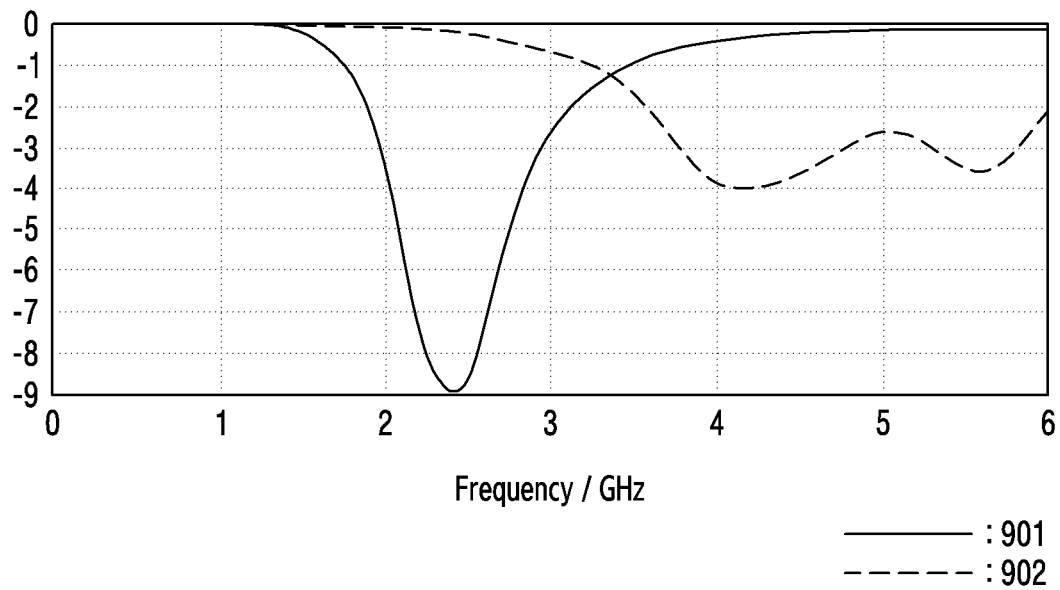

FIG. 9 is a view illustrating a current distribution of a first slot structure, a current distribution of a second slot structure, and a reflection coefficient graph of a slot antenna.

Referring to FIG. 9, a reflection coefficient graph 901 of a first slot antenna 341 and a reflection coefficient graph 902 of a second slot antenna 342 are illustrated. Hereinafter, the reflection coefficient graphs will be referred to as a first slot antenna graph 901 and a second slot antenna graph 902 in sequence.

In an embodiment, the first slot antenna graph 901 may have a relatively low S11 value of -9 dB at a frequency of about 2.4 GHz, and the second slot antenna graph 902 may have a relatively low S11 value of about -4 dB and about -3.5 dB at a frequency of about 4.2 GHz and about 5.5 GHz.

In an embodiment, the first slot antenna 341 may have a resonance frequency in a frequency band of about 2.4 GHz.

In an embodiment, the second slot antenna 342 may have a resonance frequency in a frequency band of about 4.2 GHz and about 5.5 GHz.

In an embodiment, multiple bands may be implemented by using the resonance frequencies of the first slot antenna 341 and the second slot antenna 342.

Figure 10:
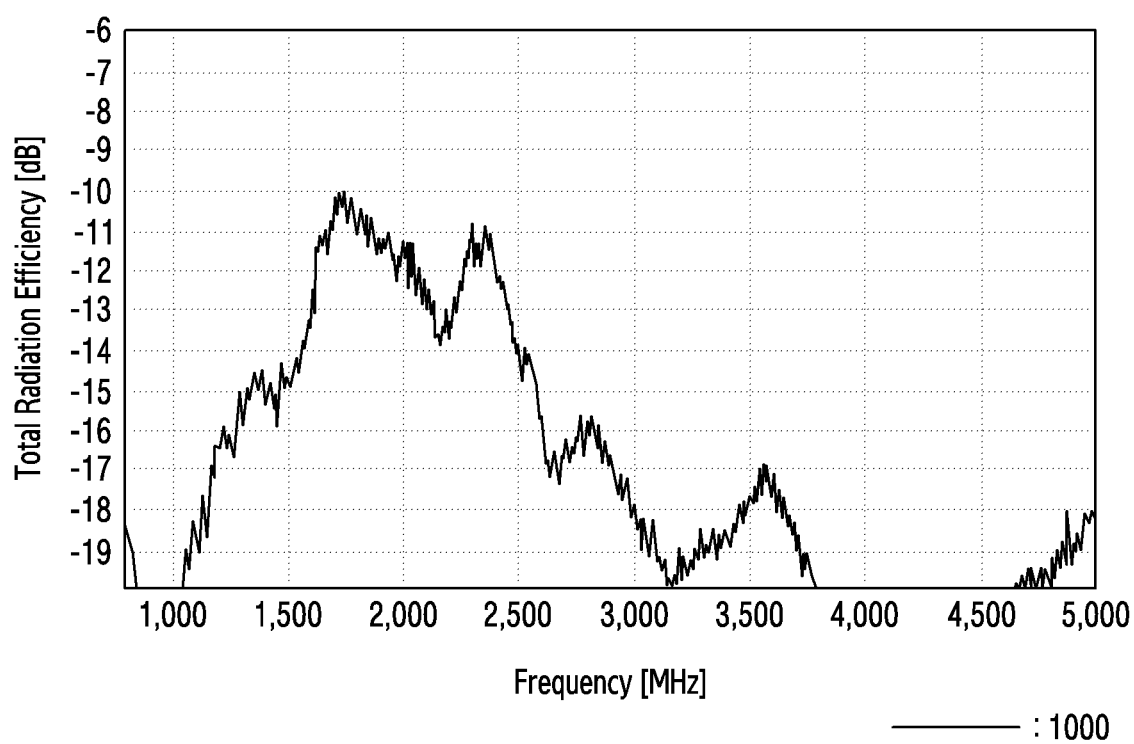
FIG. 10 is a view illustrating a total radiation efficiency graph of a slot antenna including a first slot structure and a second slot structure according to an embodiment.

FIG. 10 is a total radiation efficiency graph of a first slot antenna.

Referring to FIG. 10, a graph 1000 is a total radiation efficiency graph 1000 of the first slot antenna 341. Hereinafter, the graph 1000 will be referred to as a radiation efficiency graph 1000.

According to an embodiment, the radiation efficiency graph 1000 shows that an antenna has a high radiation efficiency of about −12~−10 dB in a frequency band of about 1,600~about 2,000 MHz.

According to an embodiment, the radiation efficiency graph 1000 shows that the antenna has a high radiation efficiency of about −11~−14 dB in a frequency band of about 2,200~about 2,500 MHz.

According to an embodiment, the first slot antenna 341 has a resonance frequency in a mid-band of 1,600~about 2,000 MHz. In an embodiment, the slot antenna including the first slot structure 211 and the second slot structure 212 may have a resonance frequency in a frequency band of about 2,200~about 2,500 MHz, and is usable as an antenna supporting a 2.4 GHz frequency band of Wi-Fi communication.

According to an embodiment, a slot antenna having a resonance frequency, which is different from the above-described embodiments, may be implemented through a change in the size of the gap of the first slot structure 211 in the x-axis direction (for example, the gap 511 in the x-axis direction of FIG. 5B) and a change in the size of the gap in the z-axis direction (for example, the gap 411 in the z-axis direction of FIG. 4B).

For example, when the size of the gap 511 of the first slot structure 211 in the x-axis direction increases, the electrical path of the first slot structure 211 may be reduced, and accordingly, the resonance frequency of the first slot antenna 341 may be shifted to a low frequency band.

Figure 11A:
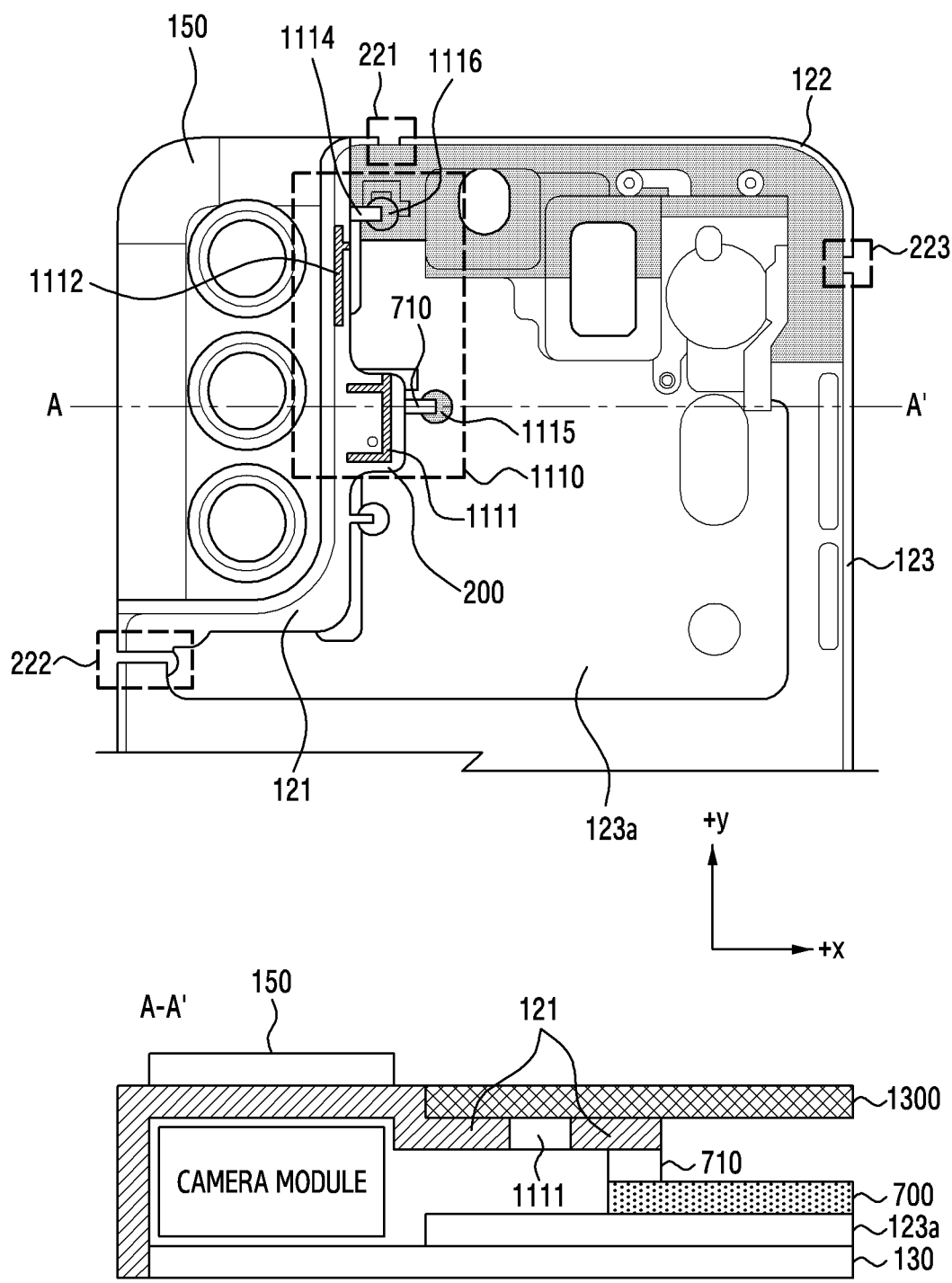
FIG. 11A is a view illustrating an additional slot antenna of an electronic device which is formed in a coupling portion of a first frame and a frame structure according to an embodiment.

FIG. 11A is a view illustrating an additional slot structure (or, additional slot) of an electronic device which is formed in a coupling portion between a first frame and a frame structure according to an embodiment.

Referring to FIG. 11A, according to an embodiment, the first frame 121 may include an additional slot structure 1110. The additional slot structure 1110 may include a third slot structure 1111 and/or a fourth slot structure 1112. The same reference numerals may be used for the components which are the same as or substantially the same as the above-described components, and a redundant explanation is omitted.

According to an embodiment, the coupling portion 200 of the first frame 121 may include the third slot structure (or, third slot) 1111 formed on a portion thereof. In an embodiment, a wireless communication circuit 320 disposed on a printed circuit board 700 may feed power from a first point 1115 to the third slot structure 1111 through a conductive connection member 710.

FIG. 11A illustrates a cross-sectional view of the electronic device 100 taken on line A-A', and illustrates a camera module (or, camera circuit, camera circuitry) disposed in the electronic device 100, which will be described in FIG. 12. In an embodiment, the electronic device 100 may include a rear surface cover 1300, and the rear surface cover 1300 may be formed with various materials. For example, the rear surface cover 1300 may be formed by an injected material and/or glass. In another embodiment, the rear surface cover 1300 may be replaced with a housing. For example, the electronic device 100 may have the rear surface formed by a portion of the housing.

According to an embodiment, the rear surface cover 1300 may be disposed over the third slot structure 1111 to prevent the third slot structure 1111 from being exposed to the outside of the electronic device 100.

According to an embodiment, the third slot structure 1111 may be an open slot structure. However, this should not be considered as limiting, and the third slot structure may be a closed slot structure.

According to an embodiment, a shape and/or a physical length of the third slot structure 1111 is not limited to the shape and/or the physical length of the third slot structure 1111 shown in FIG. 11A. In an embodiment, the shape and/or the physical length of the third slot structure 1111 may vary according to a desired frequency band in which the slot antenna including the third slot structure 111 is to operate.

According to an embodiment, the first frame 121 may include the fourth slot structure 1112 positioned on a portion that is not coupled with the camera cover 150.

According to an embodiment, the wireless communication circuit 320 may feed power from a second point 1116 of an additional contact structure 1114 to the fourth slot structure 1112. According to an embodiment, the fourth slot structure 1112 may be an open slot structure. However, this should not be considered as limiting, and the fourth slot structure may be a closed slot structure. In another embodiment, the additional contact structure 1114 may be formed by a protrusion extended from the first frame 121, not by a separate structure. In a certain embodiment, an additional conductive connection member (for example, a C-clip, a pogo-pin) may replace the additional contact structure 1114, and the wireless communication circuit 320 may feed power to the fourth slot structure 1112 through the additional conductive connection member.

According to an embodiment, a shape and/or a physical length of the fourth slot structure 1112 is not limited to the shape and/or the physical length of the fourth slot structure 1112 illustrated in FIG. 11A. In an embodiment, the shape and/or the physical length of the fourth slot structure 1112 may vary according to a desired frequency band in which the slot antenna including the fourth slot structure 1112 is to operate. In an embodiment, a position where the fourth slot structure 1112 is formed is not limited to the embodiment of FIG. 11A.

In an embodiment, an additional slot structure may further be formed in the second frame 122 and/or the third frame 123 in addition to the first frame 121.

According to an embodiment, an electrical path of a first slot structure (for example, the first slot structure 211 of FIG. 2A) may vary according to the third slot structure 1111 and/or the fourth slot structure 1112. For example, when the third slot structure 1111 is formed in the coupling portion 200, the electrical path of the first slot structure 211 may be extended as long as the length of the third slot structure 1111. Accordingly, the first slot antenna 341 including the first slot structure 211 may transmit or receive an RF signal of a frequency band different from the first frequency band.

According to another embodiment, an additional slot structure may be formed on a portion of the camera cover 150. In this case, the electrical path of the first slot structure 211, the third slot structure 1111 and/or the fourth slot structure 1112 may vary according to the additional slot structure. Accordingly, a frequency band in which the first slot antenna 341 including the first slot structure 211, a third slot antenna including the third slot structure 1111, and a fourth slot antenna including the fourth slot structure 1112 transmit or receive may be different from that before the additional slot structure is formed.

Figure 11B:
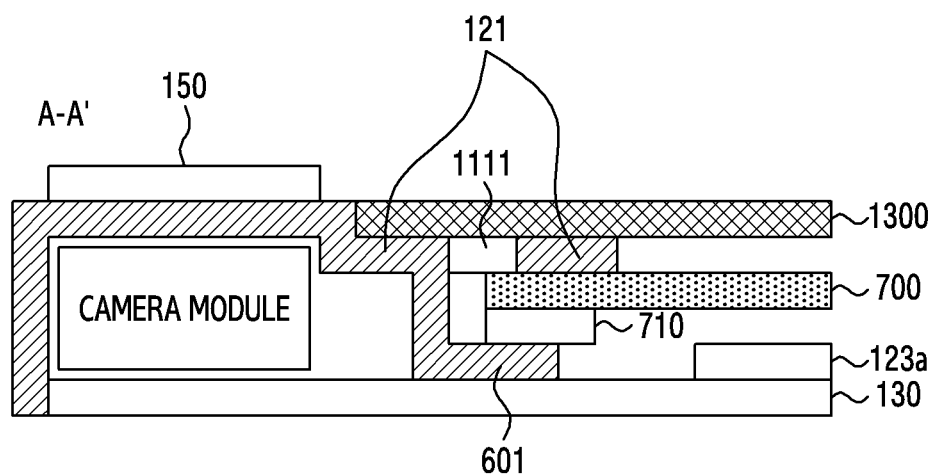
FIG. 11B is a cross-sectional view taken on line A-A' illustrating an electronic device according to an embodiment.

FIG. 11B is a cross-sectional view taken on line A-A' illustrating an electronic device according to another embodiment.

Referring to FIG. 11B, a first frame 121 according to an embodiment may include a protrusion 1113 formed adjacent to a printed circuit board 700. In an embodiment, a wireless communication circuit 320 disposed on the printed circuit board 700 may feed power from the protrusion 1113 to a third slot structure 1111 through a conductive connection member 710.

According to another embodiment, the electronic device 100 may include an additional contact structure, and the wireless communication circuit 320 may feed power from the additional contact structure to the third slot structure 1111 in replacement of the protrusion 1113.

Figure 12:
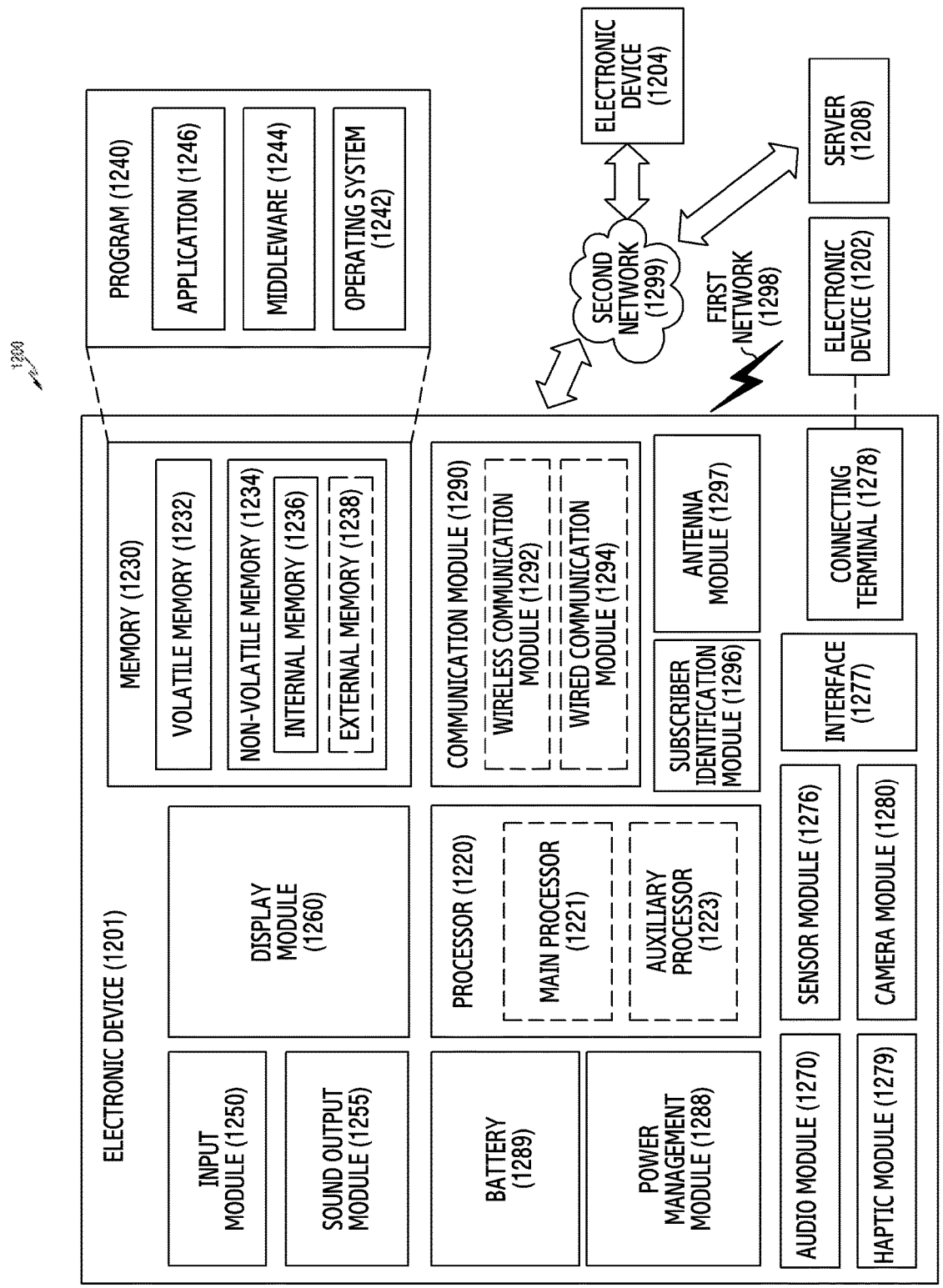
FIG. 12 is a block diagram of an electronic device in a network environment according to various embodiments.

FIG. 12 is a block diagram illustrating an electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or at least one of an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In some embodiments, at least one of the components (e.g., the connecting terminal 1278) may be omitted from the electronic device 1201, or one or more other components may be added in the electronic device 1201. In some embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201.

The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)). According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In another embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

According to an embodiment, an electronic device may include: a frame structure which forms at least part of a side surface of the electronic device; a camera cover which is integrally formed with the frame structure or is coupled with the frame structure; and a wireless communication circuit. The side surface of the electronic device formed by the frame structure may include a first surface, a second surface extended from the first surface and perpendicular to the first surface, and a third surface extended from the second surface and perpendicular to the second surface and parallel to the first surface. The camera cover may include a first corner where the first surface and the second surface intersect each other, and may form a part of the first surface of the side surface and a part of the second surface. The frame structure may include a first frame, a second frame, and a third frame, and the first frame may form a part of the second surface of the side surface, and may be extended from the second surface along a portion of the periphery of the camera cover that is not included in the first surface and the second surface, and may be coupled with the camera cover. The second frame may be spaced apart from the first frame to form a part of the second surface, and may be extended from the second surface to form a part of the third surface, and the third frame may be spaced apart from the second frame and may have a gap of a designated direction from the first frame in a first area and may be connected with the first frame in a second area. The wireless communication circuit may receive a signal of a designated frequency band by feeding power to one point of a slot structure, the slot structure being extended in parallel with the first surface and including the gap between the first frame and the third frame.

According to an embodiment, the first frame may include a first portion which forms the slot structure, the third frame may include a second portion which forms the slot structure, the first portion of the first frame may include a third area which is parallel to the first surface, the second portion of the third frame may include a fourth area which is parallel to the first surface, and the wireless communication circuit may receive a first signal based on an electrical path including the third area and the fourth area.

According to an embodiment, the first frame may include a first portion which forms the slot structure, the third frame may include a second portion which forms the slot structure, the first portion of the first frame may include a third area which is perpendicular to the first surface and the second surface, the second portion of the third frame may include a fourth area which is perpendicular to the first surface and the second surface, and the wireless communication circuit may receive a first signal based on an electrical path including the third area and the fourth area.

According to an embodiment, the electronic device may further include a printed circuit board which is disposed in the frame structure and includes a ground area, the wireless communication circuit may be disposed on the printed circuit board, and the first frame may include a contact structure disposed adjacent to the printed circuit board.

According to an embodiment, the wireless communication circuit may feed power to the contact structure of the first frame in a direction parallel to the printed circuit board.

According to an embodiment, the wireless communication circuit may feed power to the contact structure of the first frame in a direction perpendicular to the printed circuit board.

According to an embodiment, the wireless communication circuit may feed power from one point of the first frame to the slot structure.

According to an embodiment, the wireless communication circuit may feed power from one point of the third frame to the slot structure.

According to an embodiment, the frequency band may include 1500 to 2500 MHz.

According to an embodiment, the electronic device may further include an insulation portion, and the first surface may include the insulation portion positioned at one point of the first surface, and the first surface may include the camera cover extended from the insulation portion to form a part of the first surface, and the first surface may include the third frame extended from the insulation portion to form a part of the first surface.

According to an embodiment, the first frame may include a conductive pattern, and the wireless communication circuit may receive a signal of a designated frequency band by feeding power to one point of the conductive pattern of the first frame.

According to an embodiment, the first frame may include a coupling portion connected with the second frame in the second area, and the coupling portion of the first frame may further include a slot structure formed therein.

According to an embodiment, the first frame may include a conductive pattern, and the wireless communication circuit may feed power from the conductive pattern of the first frame to the slot structure.

According to an embodiment, the second frame may be spaced apart from the third frame to have a gap of a designated direction from the third frame in a third area, the second frame may be connected with the third frame in a fourth area, and the wireless communication circuit may receive a signal of a designated frequency band by feeding power to one point of the slot structure including the gap between the second frame and the third frame.

According to an embodiment, the electronic device may further include a slot structure extended in parallel to the second surface and including the gap between the first frame and the third frame.

According to an embodiment, an electronic device may include: a frame structure which forms at least part of a side surface of the electronic device; a camera cover which is integrally formed with the frame structure or is coupled with the frame structure; and a wireless communication circuit. The side surface of the electronic device formed by the frame structure may include a first surface, a second surface extended from the first surface and perpendicular to the first surface, and a third surface extended from the second surface and perpendicular to the second surface and parallel to the first surface. The camera cover may include a first corner where the first surface and the second surface intersect each other, and may form a part of the first surface of the side surface and a part of the second surface. The frame structure may include a first frame, a second frame, and a third frame, and the first frame may form a part of the second surface of the side surface, and may be extended from the second surface along a portion of the periphery of the camera cover that is not included in the first surface and the second surface, and may be coupled with the camera cover. The second frame may be spaced apart from the first frame to form a part of the second surface, and may be extended from the second surface to form a part of the third surface, and the third frame may be spaced apart from the second frame and may have a gap of a designated direction from the first frame in a first area and may be connected with the first frame in a second area. The wireless communication circuit may receive a signal of a designated frequency band by feeding power to one point of a slot structure, the slot structure being extended in parallel with the second surface and including the gap between the first frame and the third frame.

According to an embodiment, the electronic device may include a third area of the first frame which is parallel to the second surface and forms a side surface of the slot structure, and a fourth area of the third frame, and the wireless communication circuit may receive a first signal based on an electrical path including the third area and the fourth area.

According to an embodiment, the electronic device may include a third area of the first frame which is perpendicular to the first surface and the second surface and is formed along the periphery of the slot structure, and a fourth area of the third frame, and the wireless communication circuit may receive a first signal based on an electrical path including the third area and the fourth area.

According to an embodiment, the electronic device may further include a printed circuit board disposed in the frame structure and including a ground area, and the wireless communication circuit may be disposed on the printed circuit board, and the first frame may include a contact structure disposed adjacent to the printed circuit board, and the wireless communication circuit may feed power to the contact structure of the first frame in a direction perpendicular to the printed circuit board or a direction parallel to the printed circuit board.

According to an embodiment, the electronic device may further include a first insulation portion and a second insulation portion, and the first surface may include a first portion formed by the camera cover and may include a second portion formed by the third frame, and may include the first insulation portion disposed between the first portion and the second portion, and the second surface may include a third portion formed by the camera cover and may include a fourth portion formed by the second frame, and may include the second insulation portion disposed between the third portion and the fourth portion.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a frame structure including a first frame and a second frame, wherein the first frame forms a portion of a first side face of the electronic device and a portion of a second side face extending from the first side face, and wherein the second frame forms a portion of the second side face and is spaced apart from the first frame;
a camera cover integrally formed with the first frame or coupled with the first frame to form a portion of the first side face and a portion of the second side face, wherein the camera cover comprises a first corner at which the first side face and the second side face are connected;
a conductive plate; and
a wireless communication circuit,
wherein the first frame includes a portion extended from the second side face along a periphery portion of the camera cover that is not included in the first side face and the second side face,
wherein the conductive plate includes a first area spaced apart from the first frame by a gap and a second area coupled with the first frame, and
wherein the wireless communication circuit is configured to:
feed power to a point of the portion of the first frame, and
receive a signal of a specific frequency band based on an electrical path formed in the first frame and the conductive plate along a first slot structure comprising the gap.

2. The electronic device of claim 1, wherein a first portion of the first frame and a second portion of the conductive plate form a portion of the first slot structure,
and
wherein the wireless communication circuit is configured to receive a first signal based on an electrical path formed in the first portion and the second portion.

3. The electronic device of claim 2, wherein the wireless communication circuit is configured to feed power to a point of the conductive plate to receive a signal of the specific frequency band.

4. The electronic device of claim 1, wherein a non-conductive material is disposed between the first frame and the conductive plate,
wherein a second slot structure is formed to extend from the non-conductive material and disposed between the first frame and the conductive plate,
wherein a first portion of the first frame and a second portion of the conductive plate form the second slot structure, and
wherein the wireless communication circuit is configured to receive a first signal based on an electrical path formed in the first portion and the second portion.

5. The electronic device of claim 1, further comprising:
a printed circuit board comprising a ground area,
wherein the wireless communication circuit is disposed on the printed circuit board,
and
wherein the first frame comprises a protrusion including the point and disposed adjacent to the printed circuit board.

6. The electronic device of claim 5, wherein the wireless communication circuit is configured to feed power to the protrusion of the first frame.

7. The electronic device of claim 6, wherein a conductive connection member electrically connects the protrusion of the first frame and the printed circuit board.

8. The electronic device of claim 6, wherein the wireless communication circuit is configured to feed power to the protrusion of the first frame via an electromagnetic coupling.

9. The electronic device of claim 1, wherein the specific frequency band comprises 1500 to 2500 MHz.

10. The electronic device of claim 1, wherein the first frame comprises a coupling portion connected with the second area of the conductive plate, and
wherein the coupling portion of the first frame further comprises an additional slot structure.

11. The electronic device of claim 1, further comprising:
a first non-conductive member disposed between the first frame and the second frame; and
a second non-conductive member disposed between the first frame and the conductive plate.

12. The electronic device of claim 1, further comprising:
a conductive pattern for feeding the power to the point of the portion of the first frame.

13. The electronic device of claim 1, wherein the frame structure further includes a third frame spaced apart from the second frame and parallel with the first frame, and
wherein the conductive plate is included in the third frame.

14. The electronic device of claim 1, wherein the second frame is spaced apart from a third area of the conductive plate by a gap, and
wherein the second frame is connected with a fourth area of the conductive plate via a conductive connection member.

15. The electronic device of claim 1, wherein the first frame further comprises a first protrusion and a second protrusion for feeding.

* * * * *